US011088720B2

(12) United States Patent
Sakurai et al.

(10) Patent No.: US 11,088,720 B2
(45) Date of Patent: Aug. 10, 2021

(54) HIGH-FREQUENCY MODULE

(71) Applicant: Murata Manufacturing Co., Ltd., Kyoto (JP)

(72) Inventors: Satoshi Sakurai, Kyoto (JP); Satoshi Arayashiki, Kyoto (JP); Satoshi Tanaka, Kyoto (JP); Kyoichi Hirayama, Kyoto (JP); Tomohito Ito, Kyoto (JP); Kenta Kurahashi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/215,777

(22) Filed: Dec. 11, 2018

(65) Prior Publication Data

US 2019/0190563 A1 Jun. 20, 2019

(30) Foreign Application Priority Data

Dec. 20, 2017 (JP) .............................. JP2017-244351
Mar. 29, 2018 (JP) .............................. JP2018-065691
Jun. 22, 2018 (JP) ................................ 2018-119249

(51) Int. Cl.
H04B 1/48 (2006.01)
H04B 1/00 (2006.01)

(52) U.S. Cl.
CPC ............. *H04B 1/48* (2013.01); *H04B 1/0057* (2013.01)

(58) Field of Classification Search
CPC ................................ H04B 1/0057; H04B 1/48

USPC .... 455/78, 101, 127.1, 127.3, 333; 370/278, 370/281, 297
See application file for complete search history.

(56) References Cited

U.S. PATENT DOCUMENTS

| 6,236,841 B1* | 5/2001 | Akiya ...................... H01Q 3/24 455/101 |
| 7,149,496 B2* | 12/2006 | Horiuchi ................ H04B 1/005 455/333 |
| 10,116,347 B1* | 10/2018 | Xu ............................ H03F 3/72 |
| 10,218,393 B2* | 2/2019 | Banowetz ................. H03F 3/19 |
| 10,340,971 B2* | 7/2019 | Obiya ..................... H03F 3/195 |
| 2004/0113719 A1* | 6/2004 | Nakai .................. H03H 9/0557 333/133 |

(Continued)

FOREIGN PATENT DOCUMENTS

WO 2007/129716 A1 11/2007

Primary Examiner — Tan H Trinh
(74) Attorney, Agent, or Firm — Pearne & Gordon LLP

(57) ABSTRACT

A high-frequency module includes a transmission signal amplifier that outputs a transmission signal to an antenna terminal side; a reception signal amplifier that amplifies a reception signal supplied from an antenna terminal; a switch that selectively connects the antenna terminal to either an output of the transmission signal amplifier or an input of the reception signal amplifier; and a directional coupler that is provided on a transmission signal path and detects a signal level of the transmission signal. The transmission signal amplifier is controlled by a first control signal supplied from a first control circuit. The reception signal amplifier is controlled by a second control signal supplied from a second control circuit. The switch is controlled by a switch control signal supplied from the first control circuit. The directional coupler is controlled by a coupler control signal supplied from the first control circuit.

21 Claims, 17 Drawing Sheets

(56) References Cited

U.S. PATENT DOCUMENTS

| | | | |
|---|---|---|---|
| 2004/0192237 A1* | 9/2004 | Kayano | H03F 1/0211 455/127.3 |
| 2004/0203552 A1* | 10/2004 | Horiuchi | H04B 1/005 455/333 |
| 2004/0224643 A1* | 11/2004 | Nakai | H04B 1/0057 455/78 |
| 2005/0104685 A1* | 5/2005 | Kuroki | H03H 9/725 333/133 |
| 2005/0197095 A1* | 9/2005 | Nakamata | H04B 1/006 455/403 |
| 2005/0221767 A1* | 10/2005 | Suga | H04B 1/48 455/78 |
| 2005/0245283 A1* | 11/2005 | Boyle | H04B 1/0057 455/552.1 |
| 2005/0287976 A1* | 12/2005 | Burgener | H03F 3/2171 455/333 |
| 2006/0061434 A1* | 3/2006 | Ogawa | H04B 1/525 333/103 |
| 2006/0094393 A1* | 5/2006 | Okuyama | H04B 1/44 455/333 |
| 2006/0270367 A1* | 11/2006 | Burgener | H01L 27/0248 455/127.1 |
| 2006/0286947 A1* | 12/2006 | Taniguchi | H03F 1/0205 455/127.1 |
| 2008/0180169 A1 | 7/2008 | Ripley et al. | |
| 2008/0181337 A1* | 7/2008 | Maxim | H03M 1/0614 375/340 |
| 2009/0161586 A1* | 6/2009 | Kasai | H04B 1/44 370/294 |
| 2009/0207764 A1* | 8/2009 | Fukamachi | H04B 1/44 370/297 |
| 2010/0102897 A1* | 4/2010 | Moritsuka | H01P 5/227 333/109 |
| 2010/0203847 A1* | 8/2010 | Gorbachov | H03H 7/38 455/84 |
| 2011/0221529 A1* | 9/2011 | Maejima | H03F 3/217 330/207 A |
| 2012/0293235 A1* | 11/2012 | Nakamura | H04H 40/90 327/360 |
| 2013/0114470 A1* | 5/2013 | Lee | H01P 1/2135 370/278 |
| 2013/0258915 A1* | 10/2013 | Kannari | H04L 5/143 370/281 |
| 2015/0208345 A1* | 7/2015 | Weissman | H04W 52/0209 455/574 |
| 2015/0333791 A1* | 11/2015 | Anderson | H04B 1/48 455/83 |
| 2016/0277061 A1* | 9/2016 | Song | H03F 3/24 |
| 2017/0077967 A1* | 3/2017 | Srirattana | H04B 1/0057 |
| 2017/0085279 A1* | 3/2017 | Obiya | H04B 1/0475 |
| 2018/0041174 A1* | 2/2018 | Muto | H03H 7/46 |
| 2018/0138929 A1* | 5/2018 | Ella | H04L 5/001 |
| 2018/0241109 A1* | 8/2018 | Ashworth | H04B 1/00 |
| 2018/0279219 A1* | 9/2018 | Tanaka | G01S 1/04 |
| 2019/0238169 A1* | 8/2019 | Naniwa | H04B 1/1018 |
| 2020/0021024 A1* | 1/2020 | Park | H04B 1/48 |

\* cited by examiner

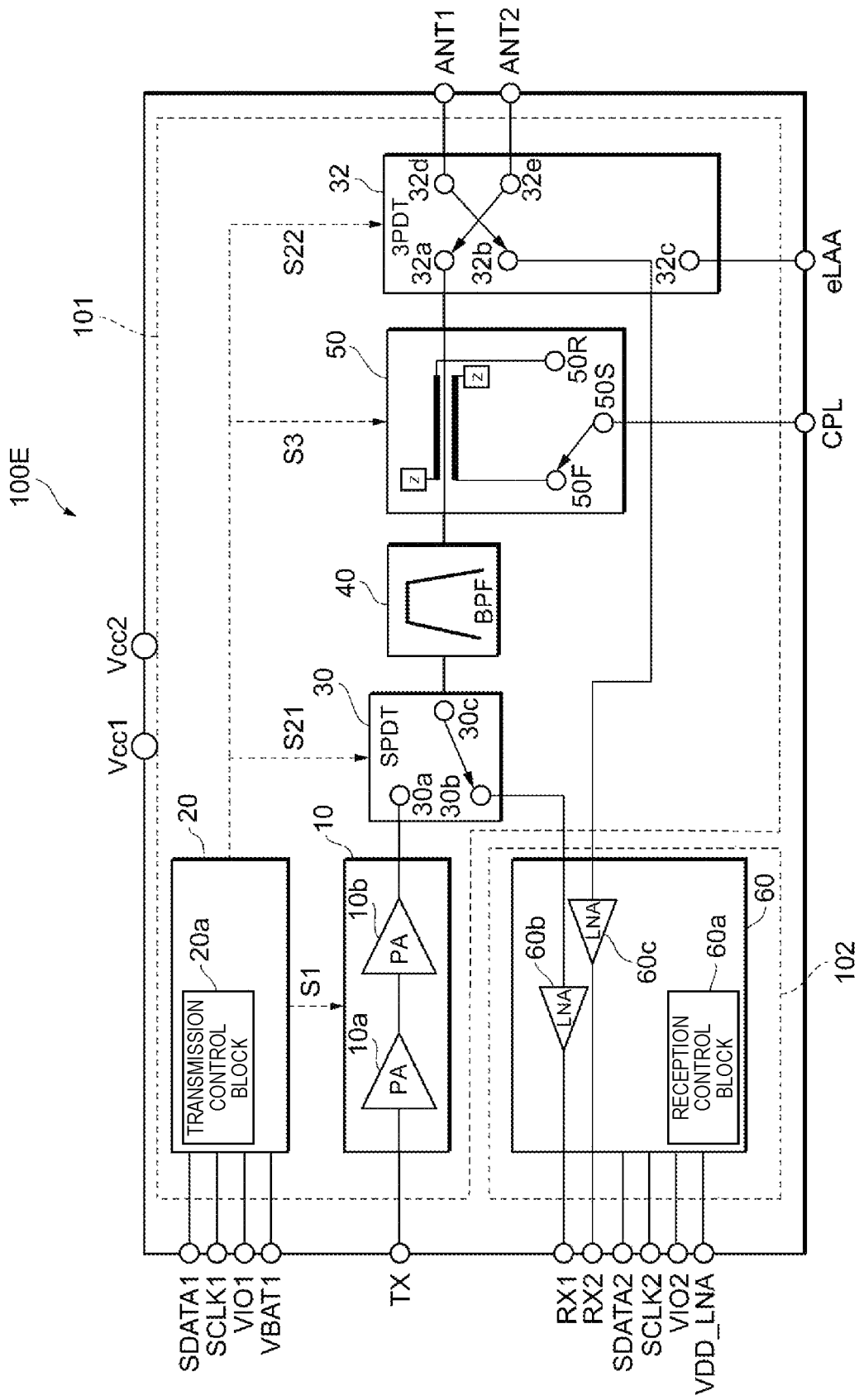

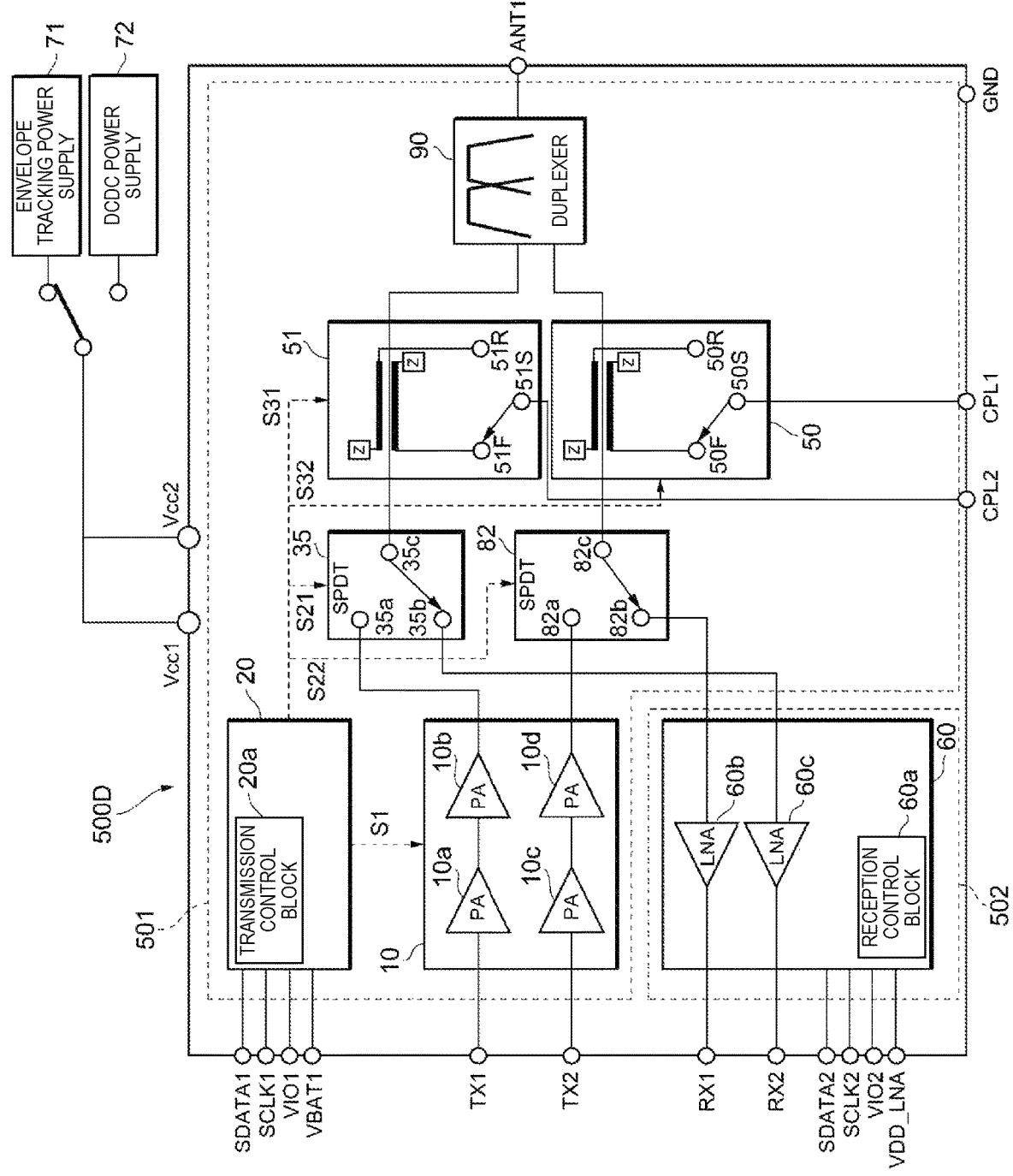

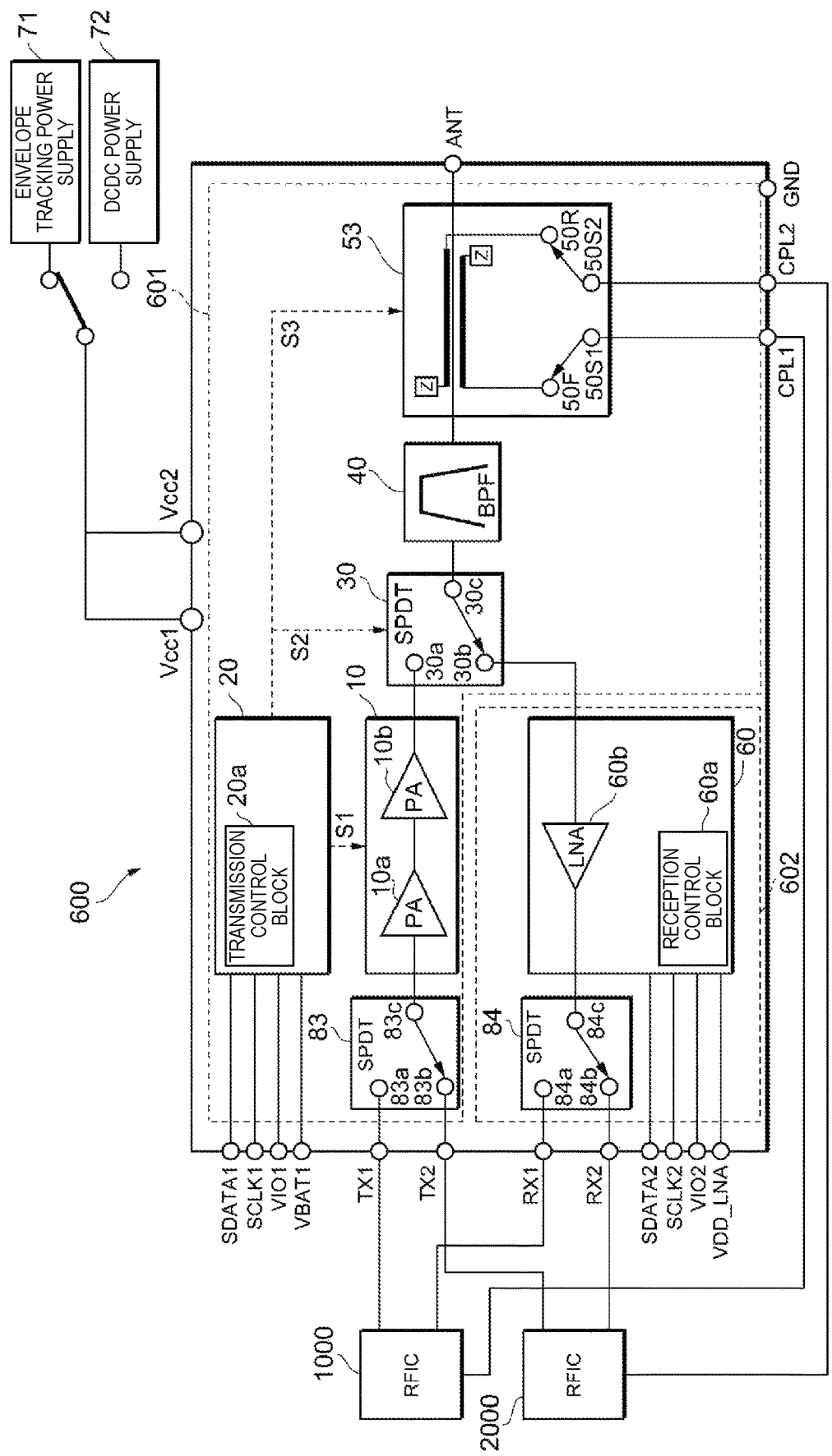

HIGH-FREQUENCY MODULE

This application claims priority from Japanese Patent Application No. 2017-244351 filed on Dec. 20, 2017, Japanese patent Application No. 2018-065691 filed on Mar. 29, 2018 and Japanese Patent Application No. 2018-119249 filed on Jun. 22, 2018. The contents of these applications are incorporated herein by reference in their entireties.

BACKGROUND

The present disclosure relates to a high-frequency module. There has been a high-frequency module that includes a transmission circuit and a reception circuit, and that switches between these circuits and connects one of them to an antenna by using a switch circuit to transmit and receive a radio frequency (RF) signal to and from a base station.

For example, United States Patent Application Publication No. 2008/0180169 discloses a power amplification module including an amplifier that outputs, as a transmission signal, an amplified signal obtained by amplifying an input signal to an antenna side, and a directional coupler coupled to a transmission signal line formed between the amplifier and an antenna.

In a high-frequency circuit, it is demanded that transmission characteristics of a transmission signal in a predetermined frequency band of each communication system are further increased, and that a transmission signal in the predetermined frequency band is inhibited from being reflected and flowing into a transmission circuit side due to, for example, antenna mismatching. Furthermore, a function of monitoring, with great accuracy, an antenna for which a communication environment is favorable is demanded. For this reason, a function of detecting, with great accuracy, not only traveling waves of transmission signals in a plurality of frequency bands output from each communication system but also a reflected wave of a transmission signal being reflected at and returning from an antenna is demanded.

In this regard, in a communication device employing a recent communication scheme, such as a multiple input and multiple output (MIMO) scheme, a plurality of antennas are used. In the case where a plurality of antennas are used, a function of monitoring an antenna direction state is demanded to select an antenna for which a communication environment is favorable. For this reason, it is greatly demanded that an antenna for which a communication environment is favorable is detected with little time delay at a point in time when control is switched from reception control to transmission control.

BRIEF SUMMARY

Thus, the present disclosure has been made in view of the above-described issues to provide a high-frequency module that enables switching to a state in which an antenna for which a communication environment is favorable is able to be detected with little time delay when transmission control and reception control are switched.

A high-frequency module according to one embodiment of the present disclosure includes a transmission signal amplifier configured to amplify a radio frequency signal and output a transmission signal to an antenna terminal side; a reception signal amplifier configured to amplify a reception signal supplied from an antenna terminal; a switch configured to selectively connect the antenna terminal to either an output of the transmission signal amplifier or an input of the reception signal amplifier; and a directional coupler provided on a transmission signal path between the transmission signal amplifier and the antenna terminal and configured to detect a signal level of the transmission signal. The transmission signal amplifier is controlled by a first control signal supplied from a first control circuit. The reception signal amplifier is controlled by a second control signal supplied from a second control circuit. The switch is controlled by a switch control signal supplied from the first control circuit. The directional coupler is controlled by a coupler control signal supplied from the first control circuit.

Embodiments of the present disclosure enable, in the high-frequency module, switching to a state in which an antenna for which a communication environment is favorable is able to be detected with little time delay when transmission control and reception control are switched.

Other features, elements, characteristics and advantages of the present disclosure will become more apparent from the following detailed description of embodiments of the present disclosure with reference to the attached drawings.

BRIEF DESCRIPTION OF THE SEVERAL VIEWS OF THE DRAWINGS

FIG. 1E illustrates an example of a configuration of a high-frequency module according to a fourth modification of the first embodiment of the present disclosure;

FIG. 5D illustrates an example of a configuration of a high-frequency module according to a third modification of the fifth embodiment of the present disclosure;

FIG. 6 illustrates an example of a configuration of a high-frequency module according to a sixth embodiment of the present disclosure.

DETAILED DESCRIPTION

Figure 1A:
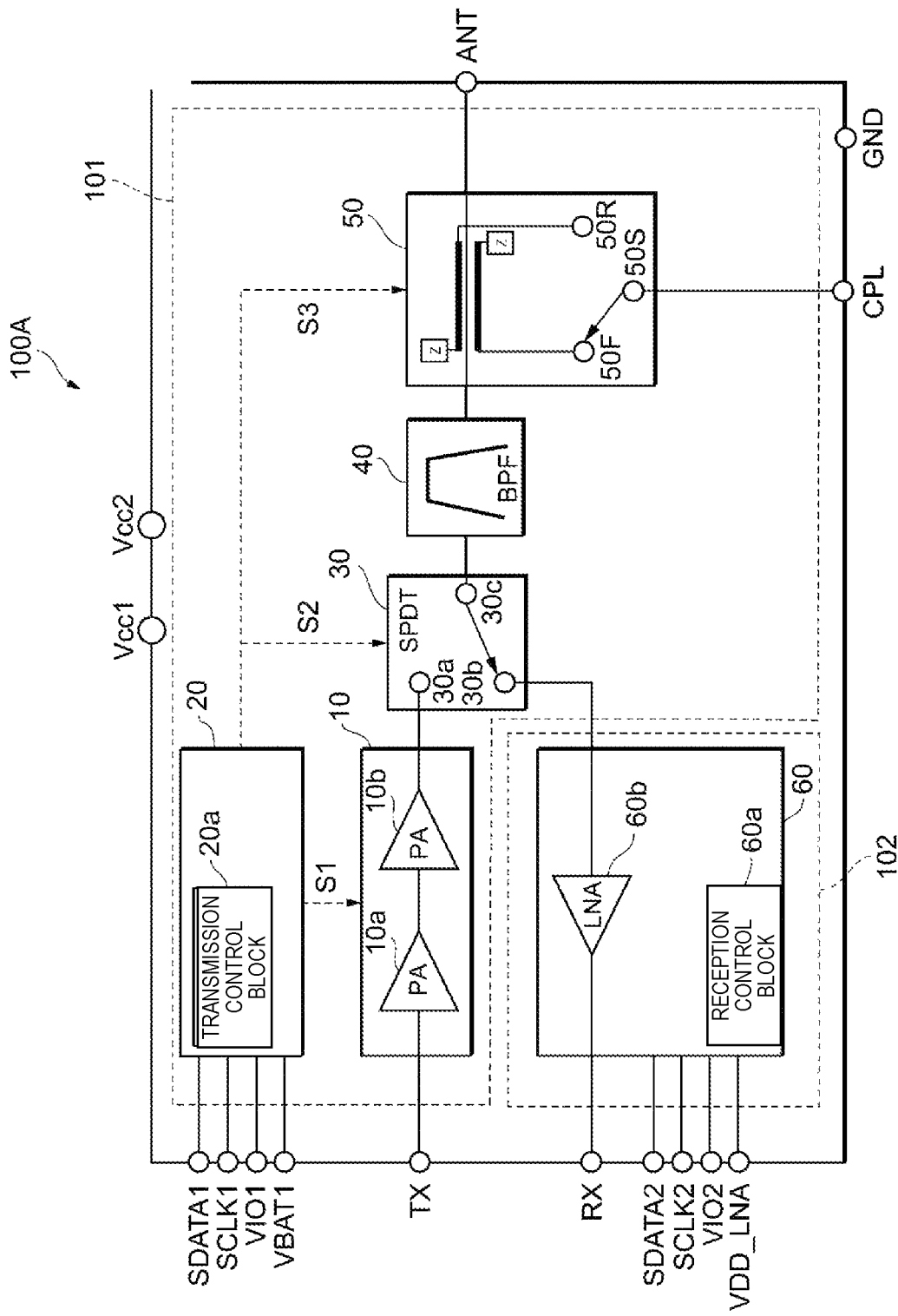
FIG. 1A illustrates an example of a configuration of a high-frequency module according to a first embodiment of the present disclosure.

Embodiments of the present disclosure will be described in detail below with reference to the drawings. Note that elements that are the same are denoted by the same reference numerals, and repeated description thereof is omitted.

(1) First Embodiment (1-1) First Embodiment

FIG. 1A illustrates an example of a configuration of a high-frequency module (high-frequency module 100A) according to a first embodiment of the present disclosure. The high-frequency module 100A is used in, for example, a mobile communication device, such as a cellular phone, to transmit and receive various signals, such as voice and data, to and from a base station. The high-frequency module 100A supports a plurality of frequency bands (multiple bands) of radio frequencies (RF). The high-frequency module 100A also supports a plurality of communication schemes (multiple modes), such as a third generation mobile communication system (3G), a fourth generation mobile communication system (4G), and a fifth generation mobile communication system (5G). A communication scheme supported by the high-frequency module 100A is not limited to these. Furthermore, the high-frequency module 100A may support carrier aggregation.

As illustrated in FIG. 1A, the high-frequency module 100A includes a front-end unit 101 and a front-end unit 102. The high-frequency module 100A includes a terminal TX for inputting a transmission signal, a terminal RX for outputting a reception signal, and a terminal ANT (antenna terminal) for connection to an antenna. A path connecting the terminal TX and the terminal ANT constitutes a transmission signal path (first signal path). A path connecting the terminal RX and the terminal ANT constitutes a reception signal path (second signal path).

Hereinafter, on the transmission signal path, "previous stage" refers to a side opposite to the antenna terminal, and "subsequent stage" refers to an antenna terminal side. Furthermore, on the reception signal path, "previous stage" refers to the antenna terminal side, and "subsequent stage" refers to the side opposite to the antenna terminal.

The high-frequency module 100A further includes, for example, terminals Vcc1, Vcc2, SDATA1, SCLK1, VIO1, VBAT1, SDATA2, SCLK2, VIO2, VDD_LNA, CPL, and GND. The terminals Vcc1 and Vcc2 are connected to an amplifier unit 10, and a power-supply voltage to be supplied to the amplifier unit 10 is input to the terminals Vcc1 and Vcc2. The terminal VBAT1 is connected to a transmission control integrated circuit (IC) 20, and a power-supply voltage to be supplied to the transmission control IC 20 is input to the terminal VBAT1. The terminal VDD_LNA is connected to a reception control unit 60, and a power-supply voltage to be supplied to the reception control unit 60 is input to the terminal VDD_LNA. The terminals SDATA1, SCLK1, and VIO1 are connected to the transmission control IC 20, and control signals SDATA1, SCLK1, and VIO1 to be supplied to the transmission control IC 20 are respectively input to the terminals SDATA1, SCLK1, and VIO1. The terminals SDATA2, SCLK2, and VIO2 are connected to the reception control unit 60, and control signals SDATA2, SCLK2, and VIO2 to be supplied to the reception control unit 60 are respectively input to the terminals SDATA2, SCLK2, and VIO2. The terminal CPL is connected to a terminal 50S of a coupler 50, and a detection signal of a traveling wave or reflected wave of a transmission signal is output from the terminal CPL as described later. The terminal GND is a ground terminal. The same signal or different signals may be input to the terminals SDATA1, SCLK1, VIO1, SDATA2, SCLK2, and VIO2.

The front-end unit 101 includes the amplifier unit 10, the transmission control IC 20, a single pole double throw (SPDT) switch 30, a band pass filter (BPF) 40, and the coupler 50. The SPDT switch 30 is connected to a subsequent stage subsequent to the amplifier unit 10 (the antenna terminal side of the amplifier unit 10), the BPF 40 is connected to a subsequent stage subsequent to the SPDT switch 30, and the coupler 50 is connected to a subsequent stage subsequent to the BPF 40.

The amplifier unit 10 (transmission signal amplifier) is formed on the transmission signal path, amplifies the power of a transmission signal supplied from the terminal TX to a level necessary to transmit the transmission signal to a base station, and outputs an amplified signal to an antenna side. The amplifier unit 10 may include a plurality of amplifiers. In the examples illustrated in FIGS. 1A to 1F, the amplifier unit 10 includes a first-stage (driver-stage) amplifier 10a and a subsequent-stage (power-stage) amplifier 10b. In the amplifier unit 10, a bias or gain is controlled based on a control signal S1 supplied from a transmission control block 20a. For example, when the high-frequency module 100A operates to perform reception control (when a low noise amplifier (LNA) 60b operates and terminals 30b and 30c are connected to each other in the SPDT switch 30), the amplifier unit 10 may stop the supply of a bias to the amplifiers 10a and 10b.

The transmission control IC 20 is a chip in which the transmission control block 20a (first control circuit) is formed. The transmission control block 20a supplies, based on the control signals SDATA1, SCLK1, VIO1, and so forth, control signals in synchronization with one another to elements, such as the amplifier unit 10, the SPDT switch 30, and the coupler 50, constituting the transmission signal path. Specifically, the transmission control block 20a respectively supplies the control signal S1 (first control signal), a control signal S2 (switch control signal), and a control signal S3 (coupler control signal) in synchronization with one another to the amplifier unit 10, the SPDT switch 30, and the coupler 50.

The SPDT switch 30 is a high-frequency switch element having 1×2 input-output terminals. Specifically, the SPDT switch 30 includes a terminal 30a on a transmission signal path side, the terminal 30b on a reception signal path side, and the terminal 30c on the antenna side. The SPDT switch 30 switches, based on the control signal S2 supplied from the transmission control block 20a, the connection of the terminal 30c on the antenna side between the terminal 30a on the transmission signal path side and the terminal 30b on the reception signal path side. That is, when the terminal 30a is connected to the terminal 30c, the transmission signal path between the terminal ANT and the terminal TX is formed, and when the terminal 30b is connected to the terminal 30c, the reception signal path between the terminal ANT and the terminal RX is formed. Furthermore, The SPDT switch 30 may be configured to terminate a terminal not operating.

The BPF 40 is a filter circuit that removes a spurious component or an out-of-band interference wave from a transmission signal or reception signal to thereby allow a frequency in a predetermined band to pass through. With respect to a frequency in the predetermined band that is allowed to pass through by the BPF 40, frequency characteristics are able to be set by freely changing a circuit configuration of the filter circuit in accordance with a communication scheme. That is, filter components are replaced.

The coupler 50 is a bidirectional coupler coupled via an electromagnetic field to a signal path and detects a power level of a traveling wave that propagates to the antenna and a power level of a reflected wave that propagates from the antenna. The coupler 50 includes a terminal 50F that outputs a detection signal of a traveling wave, a terminal 50R that outputs a detection signal of a reflected wave, and the terminal 50S that is selectively connected to either the terminal 50F or 50R. The coupler 50 switches, based on the control signal S3 supplied from the transmission control block 20*a*, the connection of the terminal 50S between the terminal 50F and the terminal 50R. The terminal 50S is connected to the terminal CPL included in the high-frequency module 100A. The terminal CPL is connected to, for example, an RFIC provided at a previous stage previous to the high-frequency module 100A (on a side opposite to the antenna), and a detection signal of a traveling wave or reflected wave is supplied to the RFIC.

The front-end unit 102 includes the reception control unit 60. The reception control unit 60 is a chip in which a reception control block 60*a* and the LNA 60*b* are formed.

The reception control block 60*a* (second control circuit) supplies, based on the control signals SDATA2, SCLK2, VIO2, and so forth, a control signal to the LNA 60*b*.

The LNA 60*b* (reception signal amplifier) is formed on the reception signal path, amplifies, based on a control signal supplied from the reception control block 60*a*, a reception signal supplied via the terminal ANT, and outputs an amplified signal to the RFIC or the like, which is not illustrated, provided on the side opposite to the antenna.

In the high-frequency module 100A according to the first embodiment of the present disclosure, the amplifier unit 10, the SPDT switch 30, and the coupler 50 respectively operate based on the control signals S1, S2, and S3 supplied in synchronization with one another from the transmission control block 20*a*. This enables switching to a state in which the quality of the antenna for which a communication environment is favorable is able to be detected with little time delay when transmission control and reception control are switched.

(1-2) First Modification of First Embodiment

Figure 1B:
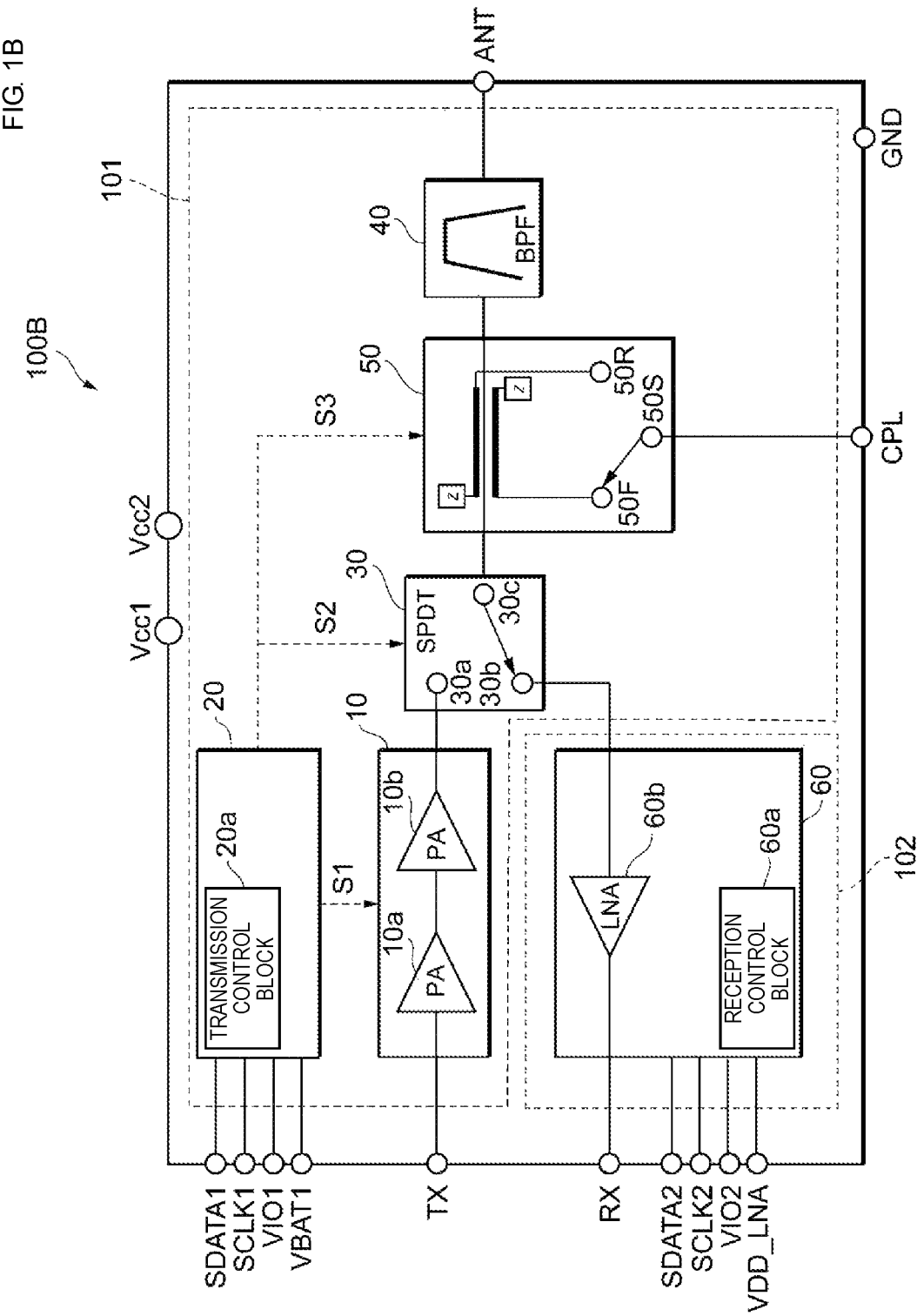
FIG. 1B illustrates an example of a configuration of a high-frequency module according to a first modification of the first embodiment of the present disclosure.

FIG. 1B illustrates an example of a configuration of a high-frequency module (high-frequency module 100B) according to a first modification of the first embodiment of the present disclosure. Hereinafter, a respect in which the configuration of the high-frequency module 100B differs from the configuration of the high-frequency module 100A will be described, and description of respects in which the configuration of the high-frequency module 100B is similar to the configuration of the high-frequency module 100A is appropriately omitted.

As illustrated in FIG. 1B, in the high-frequency module 100B, the SPDT switch 30 is connected to a subsequent stage subsequent to the amplifier unit 10, the coupler 50 is connected to a subsequent stage subsequent to the SPDT switch 30, and the BPF 40 is connected to a subsequent stage subsequent to the coupler 50. That is, the BPF 40 is disposed on the antenna terminal side with respect to the coupler 50 and the LNA 60*b*. This may inhibit an unwanted signal from flowing to the coupler 50 and the LNA 60*b* in the high-frequency module 100B from the antenna terminal.

(1-3) Second Modification of First Embodiment

Figure 1C:
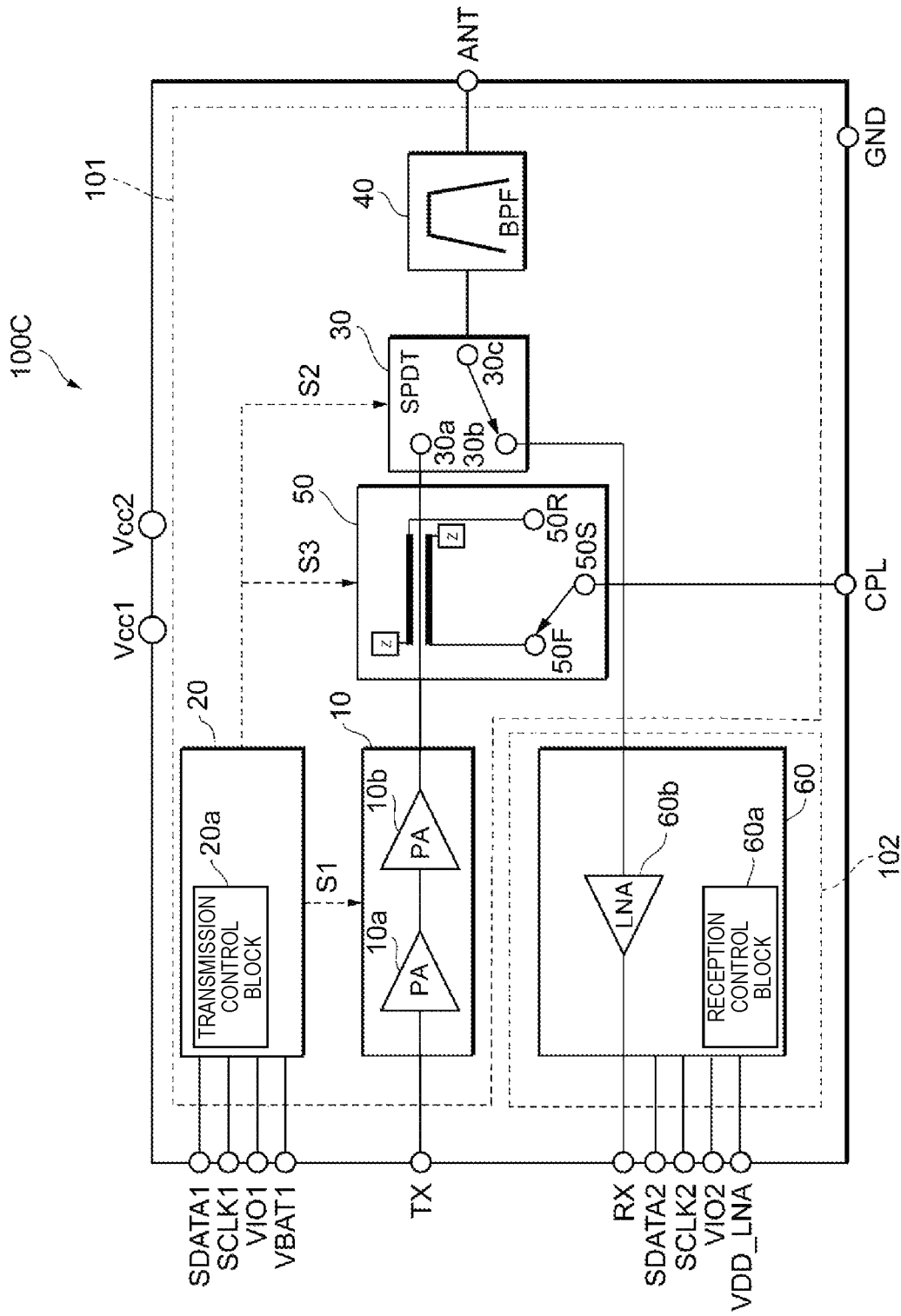
FIG. 1C illustrates an example of a configuration of a high-frequency module according to a second modification of the first embodiment of the present disclosure.

FIG. 1C illustrates an example of a configuration of a high-frequency module (high-frequency module 100C) according to a second modification of the first embodiment of the present disclosure. Hereinafter, a respect in which the configuration of the high-frequency module 100C differs from the configuration of the high-frequency module 100A will be described, and description of respects in which the configuration of the high-frequency module 100C is similar to the configuration of the high-frequency module 100A is appropriately omitted.

A typical RFIC is able to perform digital predistortion (DPD) in which an output signal to be supplied to a high-frequency module is adjusted so as to compensate for distortion of an output signal caused by an amplifier unit of the high-frequency module. In this regard, as illustrated in FIG. 1C, in the high-frequency module 100C, the coupler 50 is connected to a subsequent stage subsequent to the amplifier unit 10, the SPDT switch 30 is connected to a subsequent stage subsequent to the coupler 50, and the BPF 40 is connected to a subsequent stage subsequent to the SPDT switch 30. Thus, an output signal of the amplifier unit 10 is directly supplied to the coupler 50, and the coupler 50 directly detects the output signal of the amplifier unit 10 and is able to supply a detection signal from the terminal CPL to the RFIC, which is not illustrated. As a result, the RFIC is able to perform, based on the direct detection signal, DPD with a high degree of accuracy.

Furthermore, in the above-described configuration, the SPDT switch 30 and the BPF 40 are disposed on the antenna terminal side with respect to the coupler 50, and thus the coupler 50 is able to detect matching states of the SPDT switch 30, of the BPF 40, and on the antenna terminal side.

The coupler 50 may be a directional coupler that detects only a traveling wave. This enables reductions in loss between the amplifier unit 10 and the antenna terminal and loss between the LNA 60*b* and the antenna terminal, and also increases the reception sensitivity of the LNA 60*b*. Furthermore, the number of components of the coupler 50 is reduced, and the coupler 50 is able to be constituted by a board pattern, a ceramic component, or the like, thus enabling a reduction in the manufacturing cost of the high-frequency module 100C.

(1-4) Third Modification of First Embodiment

Figure 1D:
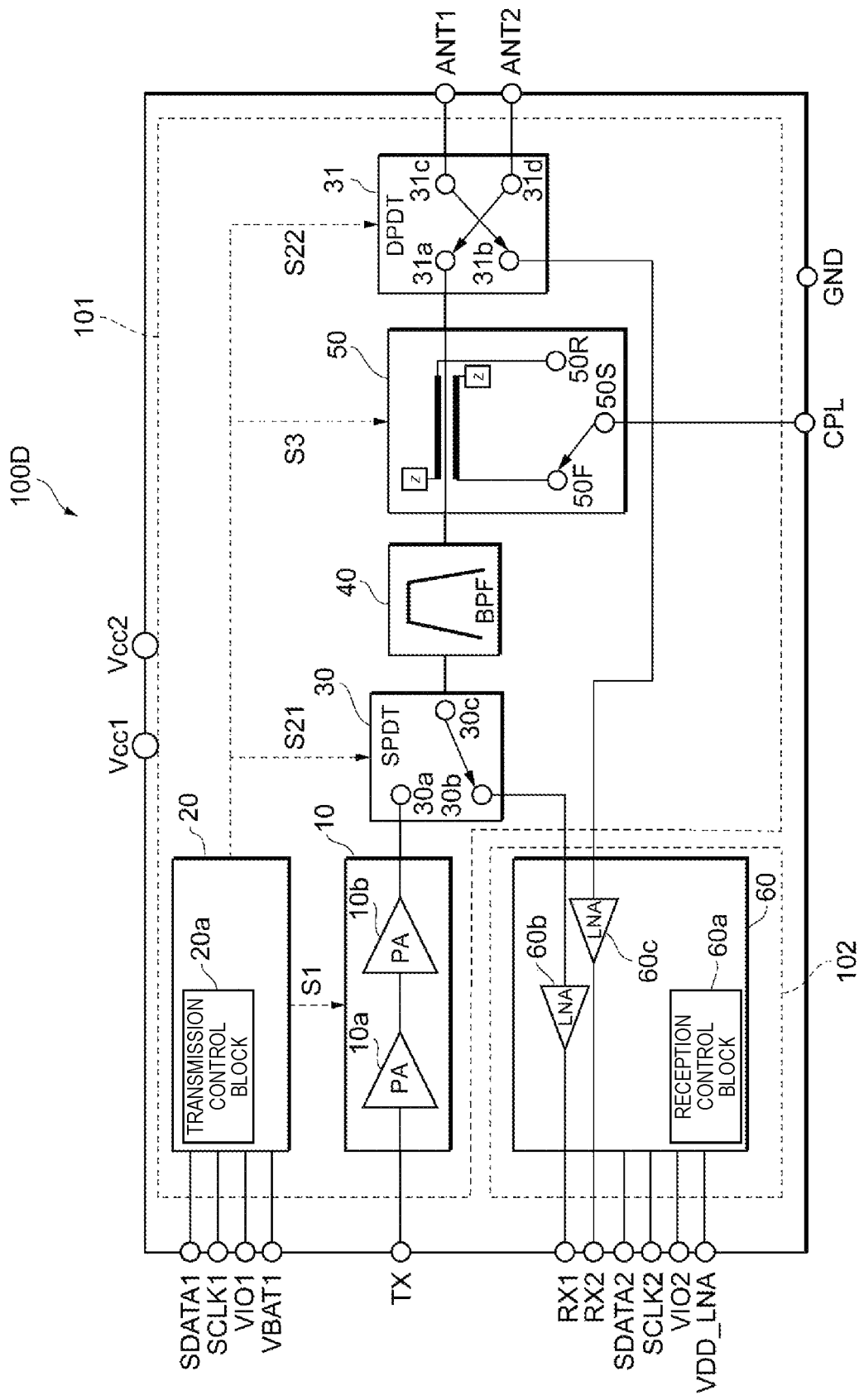
FIG. 1D illustrates an example of a configuration of a high-frequency module according to a third modification of the first embodiment of the present disclosure.

FIG. 1D illustrates an example of a configuration of a high-frequency module (high-frequency module 100D) according to a third modification of the first embodiment of the present disclosure. Hereinafter, a respect in which the configuration of the high-frequency module 100D differs from the configuration of the high-frequency module 100A will be described, and description of respects in which the configuration of the high-frequency module 100D is similar to the configuration of the high-frequency module 100A is appropriately omitted.

As illustrated in FIG. 1D, the high-frequency module 100D includes two antenna terminals ANT1 and ANT2, and two terminals RX1 and RX2 that output a reception signal. The high-frequency module 100D further includes a double pole double throw (DPDT) switch 31 and an LNA 60c. Here, the DPDT switch 31 is a high-frequency switch element having 2×2 input-output terminals and is connected to a subsequent stage subsequent to the coupler 50. The DPDT switch 31 includes a terminal 31a connected to the coupler 50, a terminal 31b connected to the LNA 60c, a terminal 31c connected to the antenna terminal ANT1, and a terminal 31d connected to the antenna terminal ANT2.

The transmission control block 20a respectively supplies a control signal S21 and a control signal S22 to the SPDT switch 30 and the DPDT switch 31. In the high-frequency module 100D, the SPDT switch 30 and the DPDT switch 31 constitute, as one unit, a switch that selectively connects the antenna terminals ANT1 and ANT2 to the transmission signal path and the reception signal path.

In the high-frequency module 100D, as a path extending through the terminal 31b of the DPDT switch 31 and the LNA 60c, a reception signal path that does not extend through the coupler 50 is able to be constructed. The high-frequency module 100D includes the two antenna terminals ANT1 and ANT2, and thus is able to select, from these two antenna terminals, an antenna terminal of which the reception sensitivity is high to connect the antenna terminal to the reception signal path. Furthermore, the high-frequency module 100D includes the two antenna terminals ANT1 and ANT2, and thus is able to support a communication scheme, such as a MIMO scheme, in which two signals are simultaneously received.

The high-frequency module 100D may further include, on the reception signal path, a BPF disposed at a previous stage previous to the LNA 60c and at a subsequent stage subsequent to the DPDT switch 31. Thus, in the reception signal path that does not extend through the coupler 50 as well, a spurious component or an out-of-band interference wave is removed from a reception signal, and a frequency in a predetermined band is thereby allowed to pass through.

(1-5) Fourth Modification of First Embodiment

FIG. 1E illustrates an example of a configuration of a high-frequency module (high-frequency module 100E) according to a fourth modification of the first embodiment of the present disclosure. Hereinafter, a respect in which the configuration of the high-frequency module 100E differs from the configuration of the high-frequency module 100D will be described, and description of respects in which the configuration of the high-frequency module 100E is similar to the configuration of the high-frequency module 100D is appropriately omitted.

As illustrated in FIG. 1E, the high-frequency module 100E includes a terminal eLAA. The terminal eLAA is a terminal for connection to another high-frequency module (not illustrated) for enhanced licensed assisted access (eLAA), which is a communication scheme. The high-frequency module 100E includes a three pole double throw (3PDT) switch 32 in place of the DPDT switch 31. Here, the 3PDT switch 32 is a high-frequency switch element having 3×2 input-output terminals. Specifically, the 3PDT switch 32 includes a terminal 32a connected to the coupler 50, a terminal 32b connected to the LNA 60c, a terminal 32c connected to the terminal eLAA, a terminal 32d connected to the antenna terminal ANT1, and a terminal 32e connected to the antenna terminal ANT2. Thus, the other high-frequency module and the antenna terminals ANT1 and ANT2 of the high-frequency module 100E are able to be supplied.

(1-6) Fifth Modification of First Embodiment

Figure 1F:
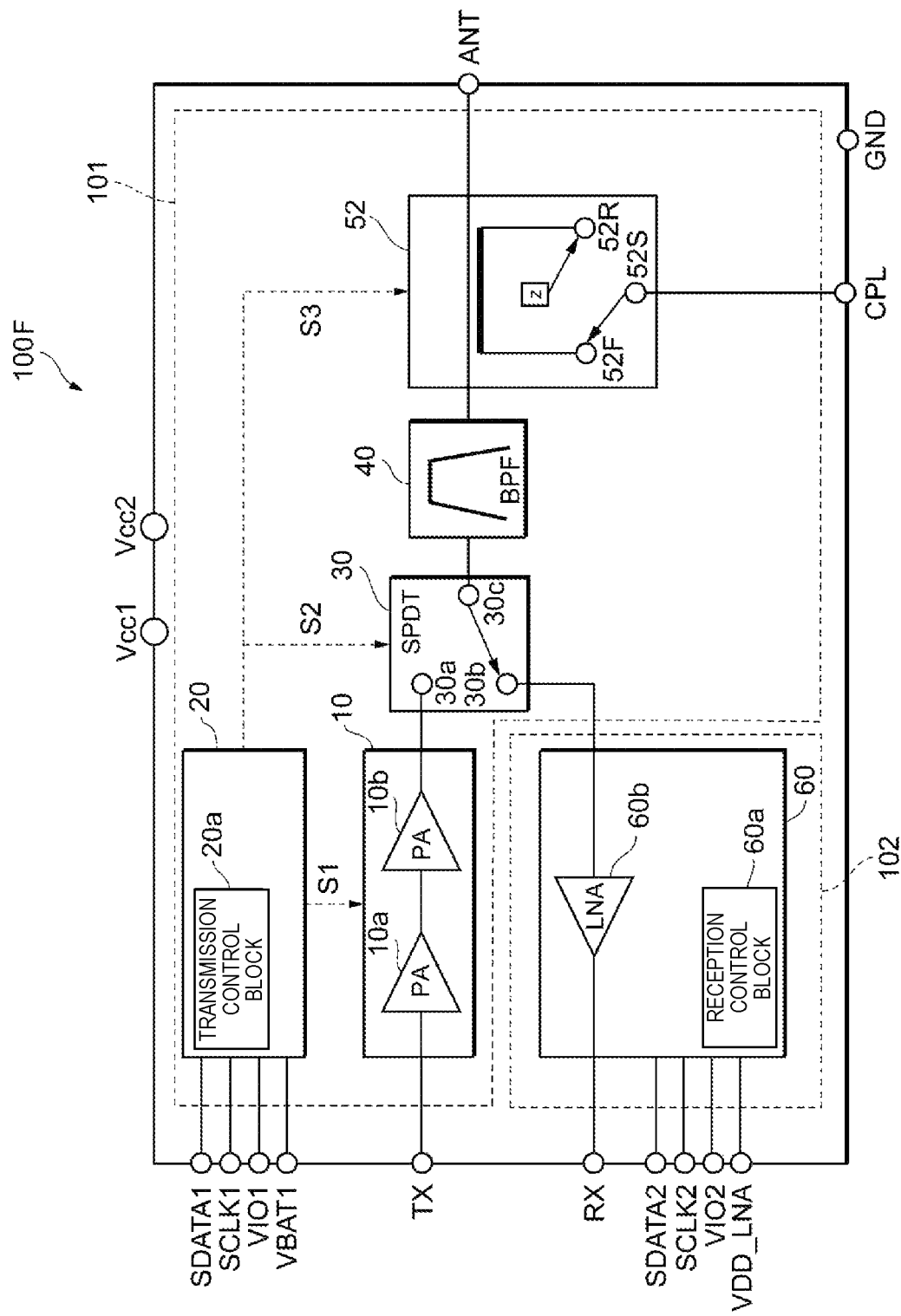
FIG. 1F illustrates an example of a configuration of a high-frequency module according to a fifth modification of the first embodiment of the present disclosure.

FIG. 1F illustrates an example of a configuration of a high-frequency module (high-frequency module 100F) according to a fifth modification of the first embodiment of the present disclosure. Hereinafter, a respect in which the configuration of the high-frequency module 100F differs from the configuration of the high-frequency module 100A will be described, and description of respects in which the configuration of the high-frequency module 100F is similar to the configuration of the high-frequency module 100A is appropriately omitted.

As illustrated in FIG. 1F, the high-frequency module 100F includes a coupler 52 in place of the coupler 50. The coupler 52 includes only one sub line and is able to detect a traveling wave and a reflected wave. The coupler 52 includes a terminal 52F that outputs a detection signal of a traveling wave, a terminal 52R that outputs a detection signal of a reflected wave, and a terminal 52S that is selectively connected to either the terminal 52F or 52R. In the coupler 52, when the terminal 52S is connected to the terminal 52F, the terminal 52R is connected to a termination resistor Z, and, when the terminal 52S is connected to the terminal 52R, the terminal 52F is connected to the termination resistor Z.

(2) Second Embodiment

Figure 2:
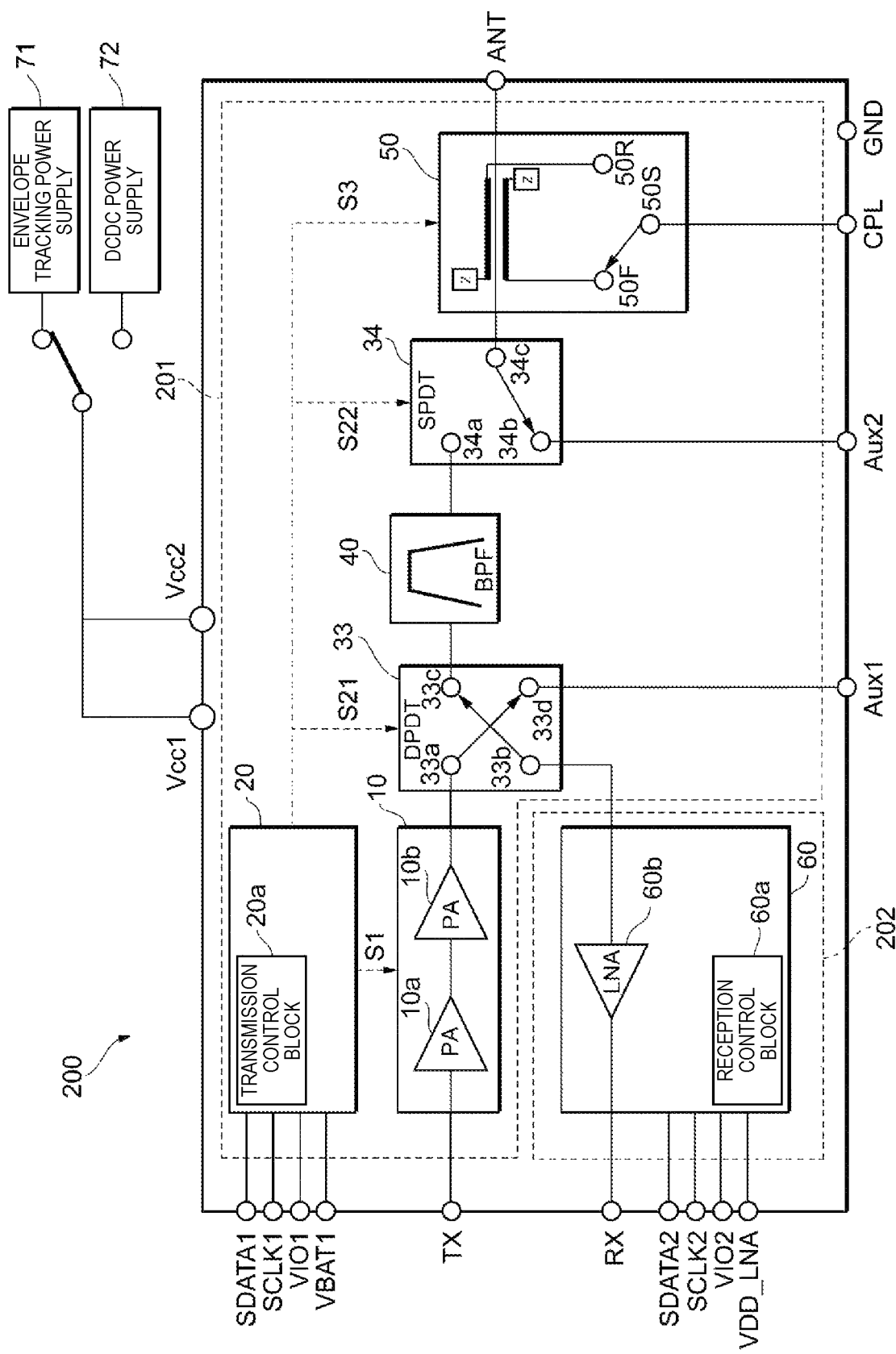
FIG. 2 illustrates an example of a configuration of a high-frequency module according to a second embodiment of the present disclosure.

FIG. 2 illustrates an example of a configuration of a high-frequency module (high-frequency module 200) according to a second embodiment of the present disclosure. Hereinafter, a respect in which the configuration of the high-frequency module 200 differs from the configuration of the high-frequency module 100A will be described, and description of respects in which the configuration of the high-frequency module 200 is similar to the configuration of the high-frequency module 100A is appropriately omitted.

As illustrated in FIG. 2, the high-frequency module 200 further includes a DPDT switch 33 and an SPDT switch 34 in place of the SPDT switch 30. The DPDT switch 33 is connected to a subsequent stage subsequent to the amplifier unit 10, the BPF 40 is connected to a subsequent stage subsequent to the DPDT switch 33, the SPDT switch 34 is connected to a subsequent stage subsequent to the BPF 40, and the coupler 50 is connected to a subsequent stage subsequent to the SPDT switch 34. The transmission control block 20a respectively supplies the control signal S21 and the control signal S22 to the DPDT switch 33 and the SPDT switch 34, respectively. In the high-frequency module 200, the DPDT switch 33 and the SPDT switch 34 constitute, as one unit, a switch that selectively connects the antenna terminal ANT to the transmission signal path and the reception signal path.

The DPDT switch 33 includes a terminal 33a connected to the amplifier 10b, a terminal 33b connected to the LNA 60b, a terminal 33c connected to the BPF 40, and a terminal 33d connected to a terminal Aux1. The SPDT switch 34 includes a terminal 34a connected to the BPF 40, a terminal 34b connected to a terminal Aux2, and a terminal 34c connected to the coupler 50. The high-frequency module 200 further includes the terminals Aux1 and Aux2. The terminals Aux1 and Aux2 are terminals for connection to an external BPF. Thus, the BPF 40 and the external BPF are able to be selectively used in accordance with a desired frequency band.

An envelope tracking power supply 71 and a direct current to direct current (DCDC) power supply 72 are selectively connected to the terminals Vcc1 and Vcc2 of the high-frequency module 200. During envelope tracking operation in which a bias is controlled in accordance with an envelope waveform of a signal, a power-supply voltage is supplied by the envelope tracking power supply 71 to the amplifier unit 10 via the terminals Vcc1 and Vcc2. During average power tracking operation in which a bias is controlled based on an average value of signal levels, a power-supply voltage is supplied by the DCDC power supply 72 to the amplifier unit 10 via the terminals Vcc1 and Vcc2.

(3) Third Embodiment

(3-1) Third Embodiment

Figure 3A:
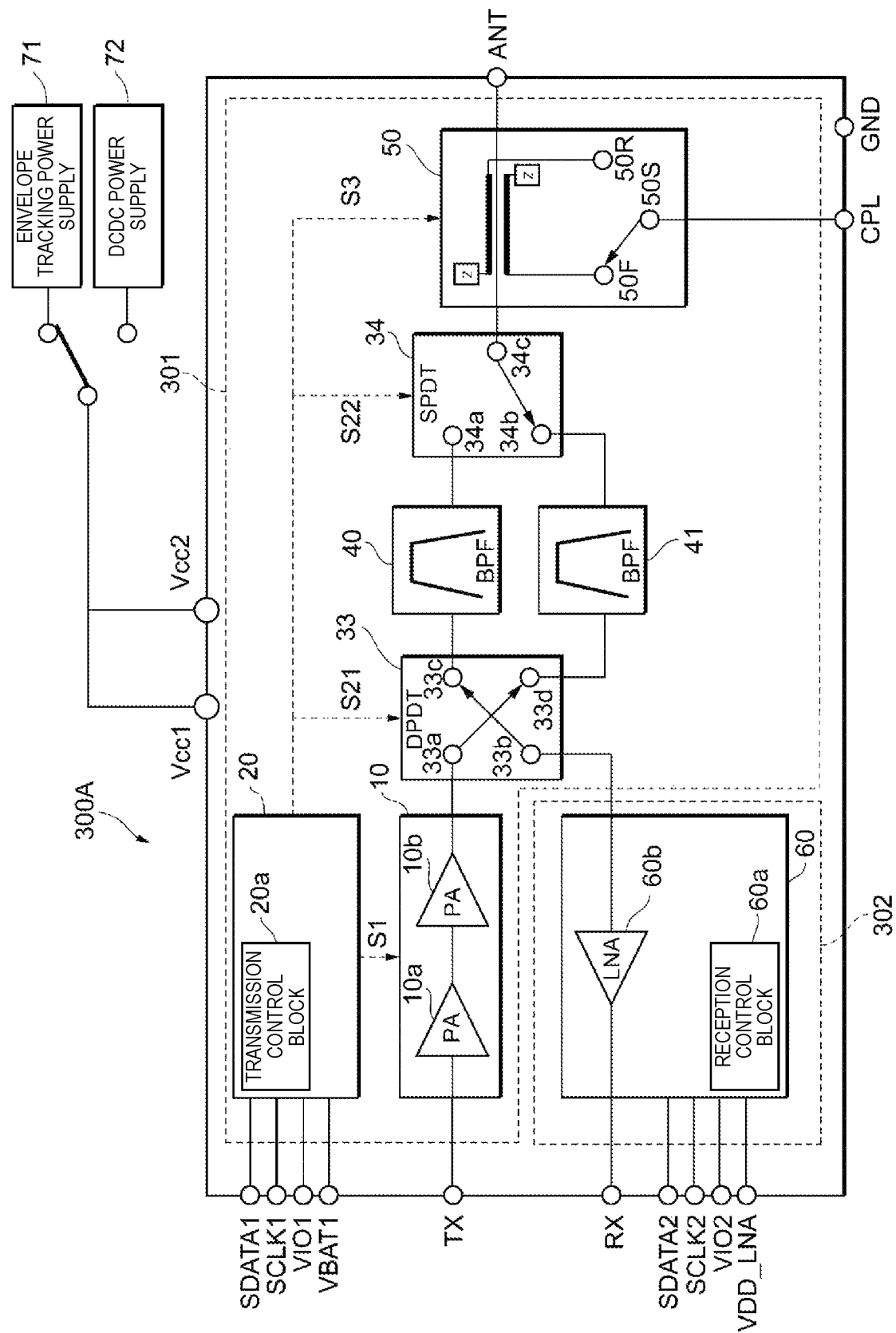
FIG. 3A illustrates an example of a configuration of a high-frequency module according to a third embodiment of the present disclosure.

FIG. 3A illustrates an example of a configuration of a high-frequency module (high-frequency module 300A) according to a third embodiment of the present disclosure. Hereinafter, a respect in which the configuration of the high-frequency module 300A differs from the configuration of the high-frequency module 200 will be described, and description of respects in which the configuration of the high-frequency module 300A is similar to the configuration of the high-frequency module 200 is appropriately omitted.

As illustrated in FIG. 3A, the high-frequency module 300A does not include the terminals Aux1 and Aux2. The high-frequency module 300A further includes a BPF 41. Each of the terminal 33d of the DPDT switch 33 and the terminal 34b of the SPDT switch 34 is connected to the BPF 41. That is, the BPF 41 is disposed at a subsequent stage subsequent to the DPDT switch 33 and at a previous stage previous to the SPDT switch 34 in parallel with the BPF 40. Thus, the BPF 40 and the BPF 41 are able to be selectively used in accordance with a desired frequency band.

(3-2) First Modification of Third Embodiment

Figure 3B:
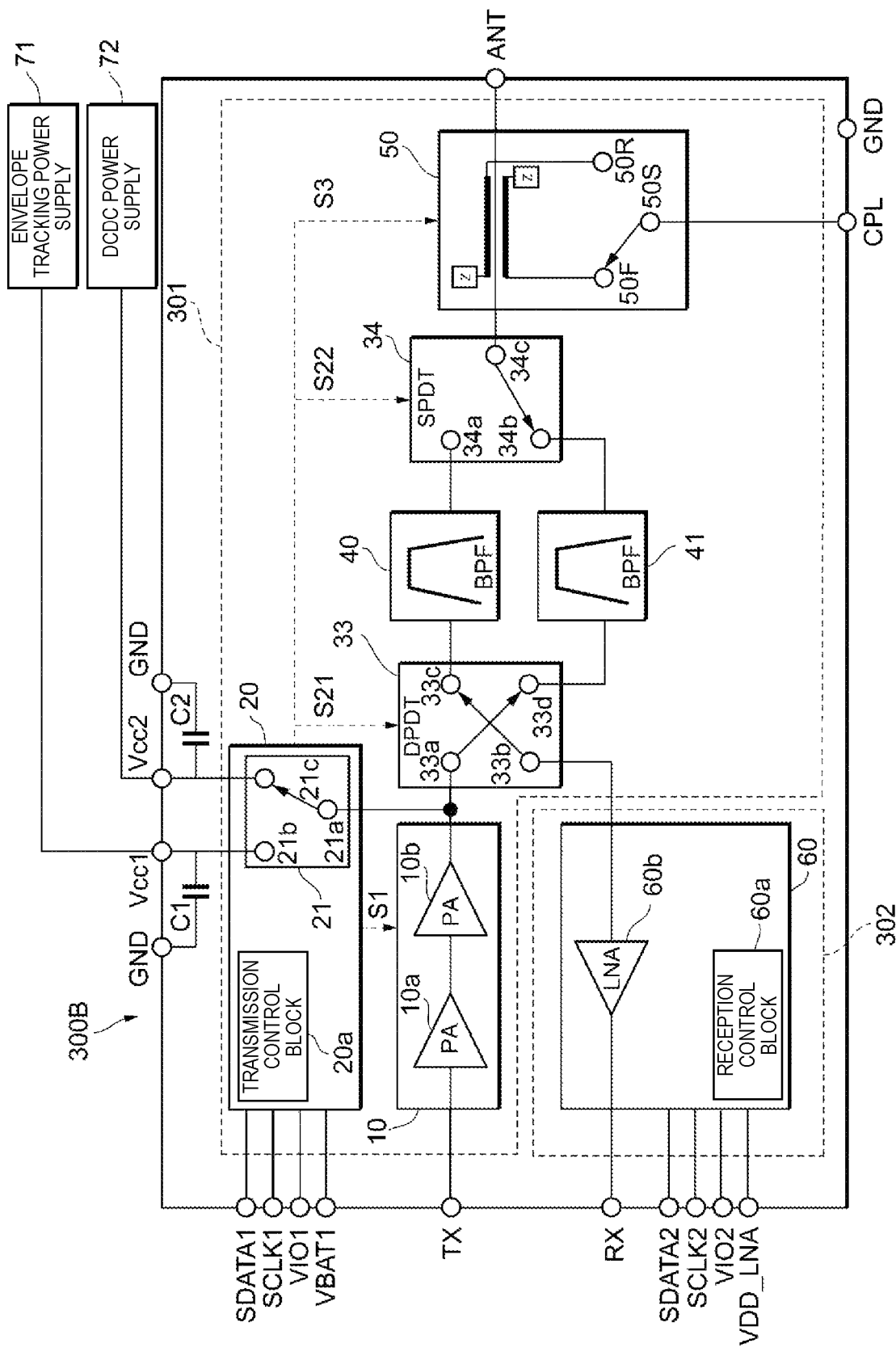
FIG. 3B illustrates an example of a configuration of a high-frequency module according to a first modification of the third embodiment of the present disclosure.

FIG. 3B illustrates an example of a configuration of a high-frequency module (high-frequency module 300B) according to a first modification of the third embodiment of the present disclosure. Hereinafter, a respect in which the configuration of the high-frequency module 300B differs from the configuration of the high-frequency module 300A will be described, and description of respects in which the configuration of the high-frequency module 300B is similar to the configuration of the high-frequency module 300A is appropriately omitted.

As illustrated in FIG. 3B, the transmission control IC 20 of the high-frequency module 300B includes a switch 21. The switch 21 includes a terminal 21a connected between the amplifier 10b and the terminal 33a of the DPDT switch 33, a terminal 21b connected to the terminal Vcc1, and a terminal 21c connected to the terminal Vcc2.

Furthermore, the high-frequency module 300B includes capacitors C1 and C2 that each serves as a bypass capacitor. One end of the capacitor C1 is connected between the terminal 21b and the terminal Vcc1, and the other end is connected to a ground terminal GND of the high-frequency module 300B. One end of the capacitor C2 is connected between the terminal 21c and the terminal Vcc2, and the other end is connected to a ground terminal GND of the high-frequency module 300B.

In the high-frequency module 300B, different bypass capacitors are able to be selected in accordance with different power supplies (the envelope tracking power supply 71 and the DCDC power supply 72 in the example illustrated in FIG. 3B).

(4) Fourth Embodiment

Figure 4:
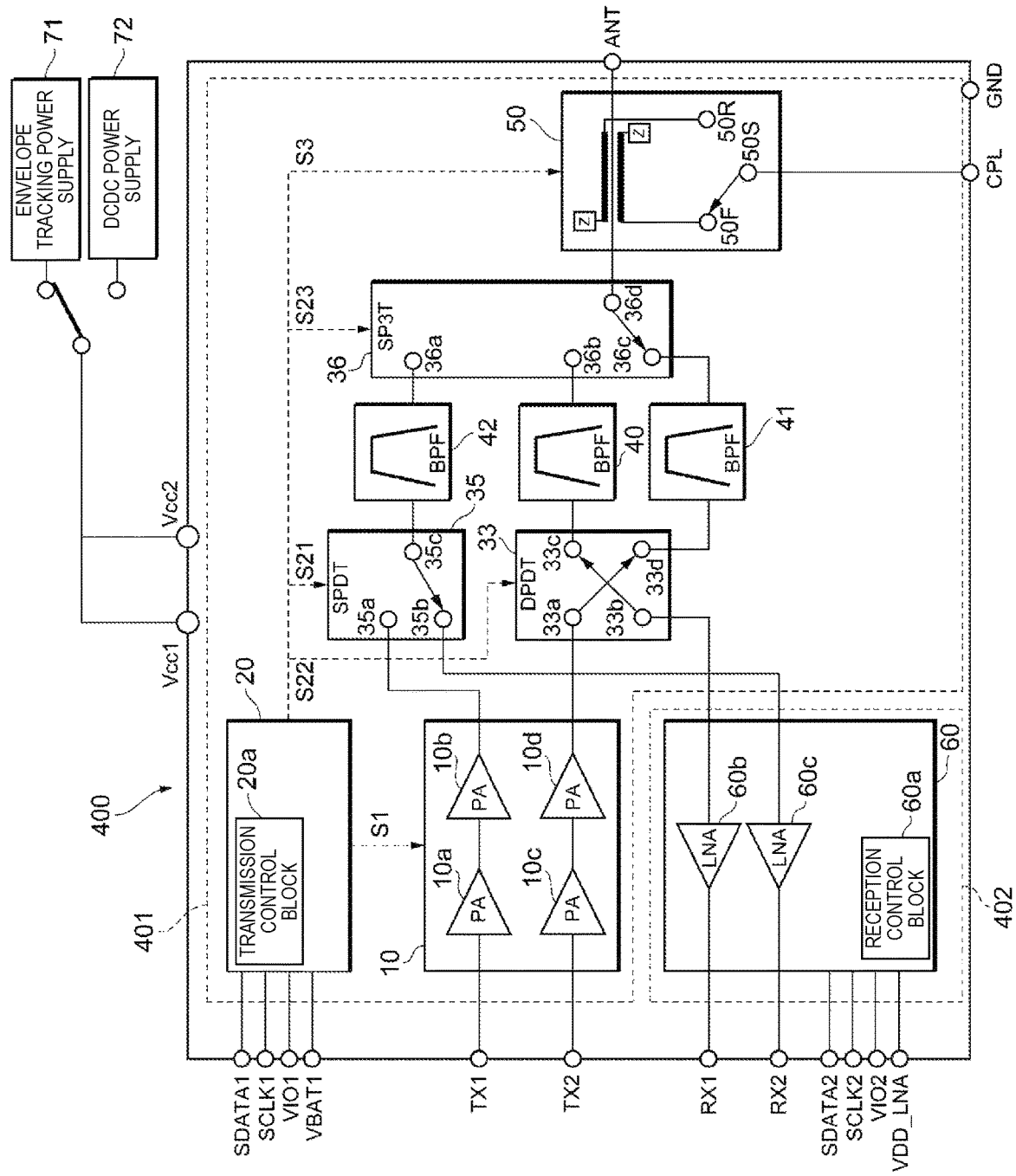
FIG. 4 illustrates an example of a configuration of a high-frequency module according to a fourth embodiment of the present disclosure.

FIG. 4 illustrates an example of a configuration of a high-frequency module (high-frequency module 400) according to a fourth embodiment of the present disclosure. Hereinafter, a respect in which the configuration of the high-frequency module 400 differs from the configuration of the high-frequency module 100 will be described, and description of respects in which the configuration of the high-frequency module 400 is similar to the configuration of the high-frequency module 100 is appropriately omitted.

The high-frequency module 400 includes two terminals TX1 and TX2 for inputting a transmission signal, and the two terminals RX1 and RX2 for outputting a reception signal. The amplifier unit 10 includes the first-stage amplifier 10a and the subsequent-stage amplifier 10b that are formed along a transmission signal path (first transmission signal path) extending from the terminal TX1. Furthermore, the amplifier unit 10 includes a first-stage amplifier 10c and a subsequent-stage amplifier 10d that are formed along a transmission signal path (second transmission signal path) extending from the terminal TX2. The reception control unit 60 includes the LNA 60b formed along a reception signal path (first reception signal path) extending from the terminal RX1, and the LNA 60c formed along a reception signal path (second reception signal path) extending from the terminal RX2.

The high-frequency module 400 includes an SPDT switch 35, the DPDT switch 33, a single pole three throw (SP3T) switch 36, and BPFs 40, 41, and 42. The SP3T switch 36 is a high-frequency switch element having a 1×3 input-output terminal. The SPDT switch 35 and the DPDT switch 33 are respectively connected to a subsequent stage subsequent to the amplifier unit 10 and a subsequent stage subsequent to the reception control unit 60. The BPF 42 is connected to a subsequent stage subsequent to the SPDT switch 35, and each of the BPFs 40 and 41 is connected to a subsequent stage subsequent to the DPDT switch 33. The SP3T switch 36 is connected to subsequent stages subsequent to the BPFs 40, 41, and 42. The coupler 50 is connected to a subsequent stage subsequent to the SP3T switch 36.

The transmission control block 20a respectively supplies the control signal S21, the control signal S22, and a control signal S23 to the SPDT switch 35, the DPDT switch 33, and the SP3T switch 36. In the high-frequency module 400, the SPDT switch 35, the DPDT switch 33, and the SP3T switch 36 constitute, as one unit, a switch that selectively connects the antenna terminal ANT to the transmission signal paths and the reception signal paths.

(5) Fifth Embodiment

(5-1) Fifth Embodiment

Figure 5A:
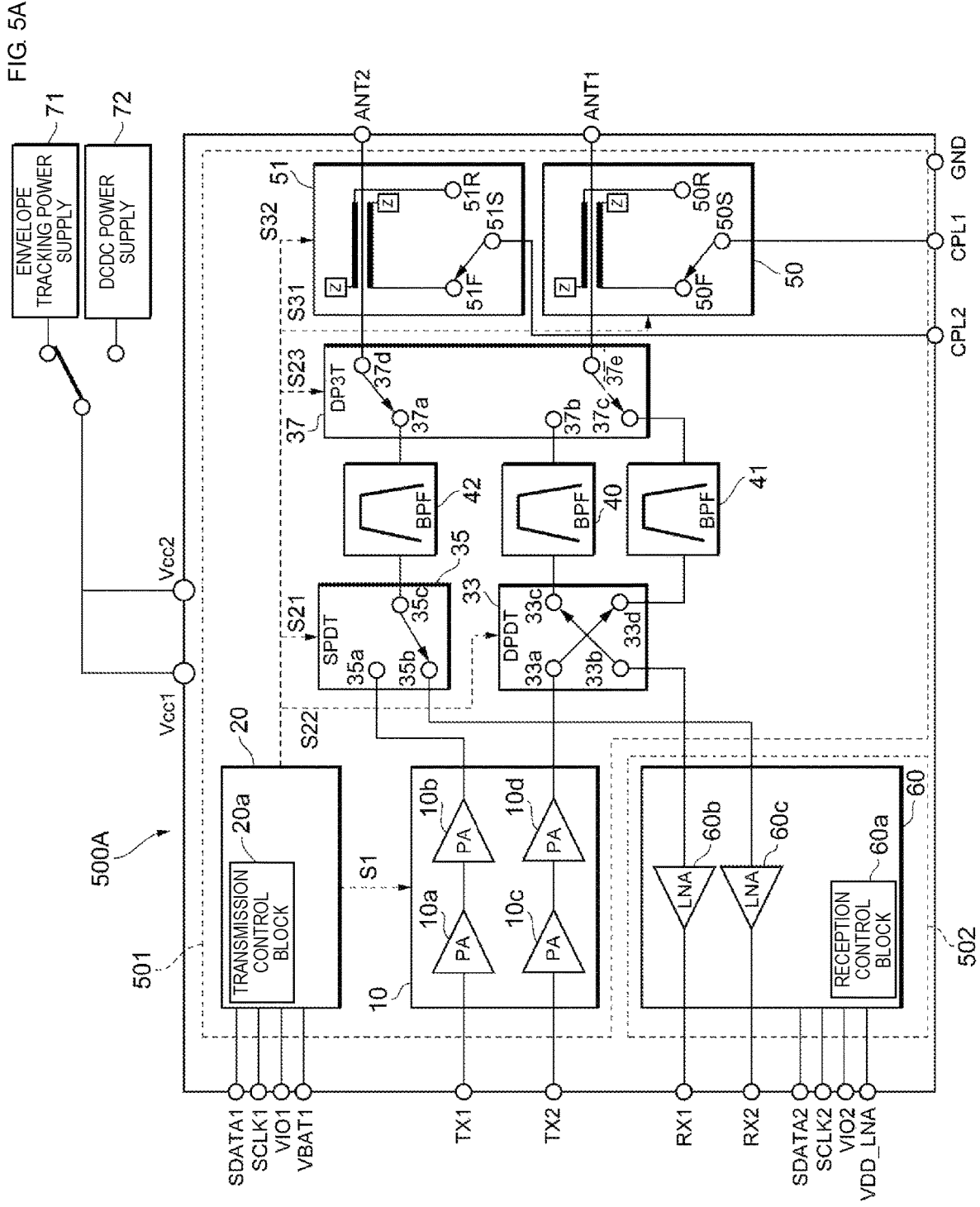
FIG. 5A illustrates an example of a configuration of a high-frequency module according to a fifth embodiment of the present disclosure.

FIG. 5A illustrates an example of a configuration of a high-frequency module (high-frequency module 500A) according to a fifth embodiment of the present disclosure. Hereinafter, a respect in which the configuration of the high-frequency module 500A differs from the configuration of the high-frequency module 400 will be described, and description of respects in which the configuration of the high-frequency module 500A is similar to the configuration of the high-frequency module 400 is appropriately omitted.

The high-frequency module 500A includes the antenna terminals ANT1 and ANT2, and terminals CPL1 and CPL2. Furthermore, the high-frequency module 500A includes a double pole three throw (DP3T) switch 37 in place of the SP3T switch 36. The DP3T switch 37 is a high-frequency switch element having a 2×3 input-output terminal.

The DP3T switch 37 includes a terminal 37a connected to the BPF 42, a terminal 37b connected to the BPF 40, a terminal 37c connected to the BPF 41, a terminal 37d connected to a coupler 51, and a terminal 37e connected to the coupler 50.

The high-frequency module 500A further includes the coupler 51. The coupler 51 is connected to a subsequent stage subsequent to the DP3T switch 37. The coupler 51 includes a terminal 51F that outputs a detection signal of a traveling wave, a terminal 51R that outputs a detection signal of a reflected wave, and a terminal 51S that is selectively connected to either the terminal 51F or 51R.

The transmission control block 20a respectively supplies the control signal S1, the control signal S21, the control signal S22, the control signal S23, a control signal S31, and a control signal S32 to the amplifier unit 10, the SPDT switch 35, the DPDT switch 33, the DP3T switch 37, the coupler 50, and the coupler 51.

In the high-frequency module 500A, two systems of transmission signal paths and two systems of reception signal paths are constructed, thus enabling simultaneous operation for two frequency bands.

(5-2) First Modification of Fifth Embodiment

Figure 5B:
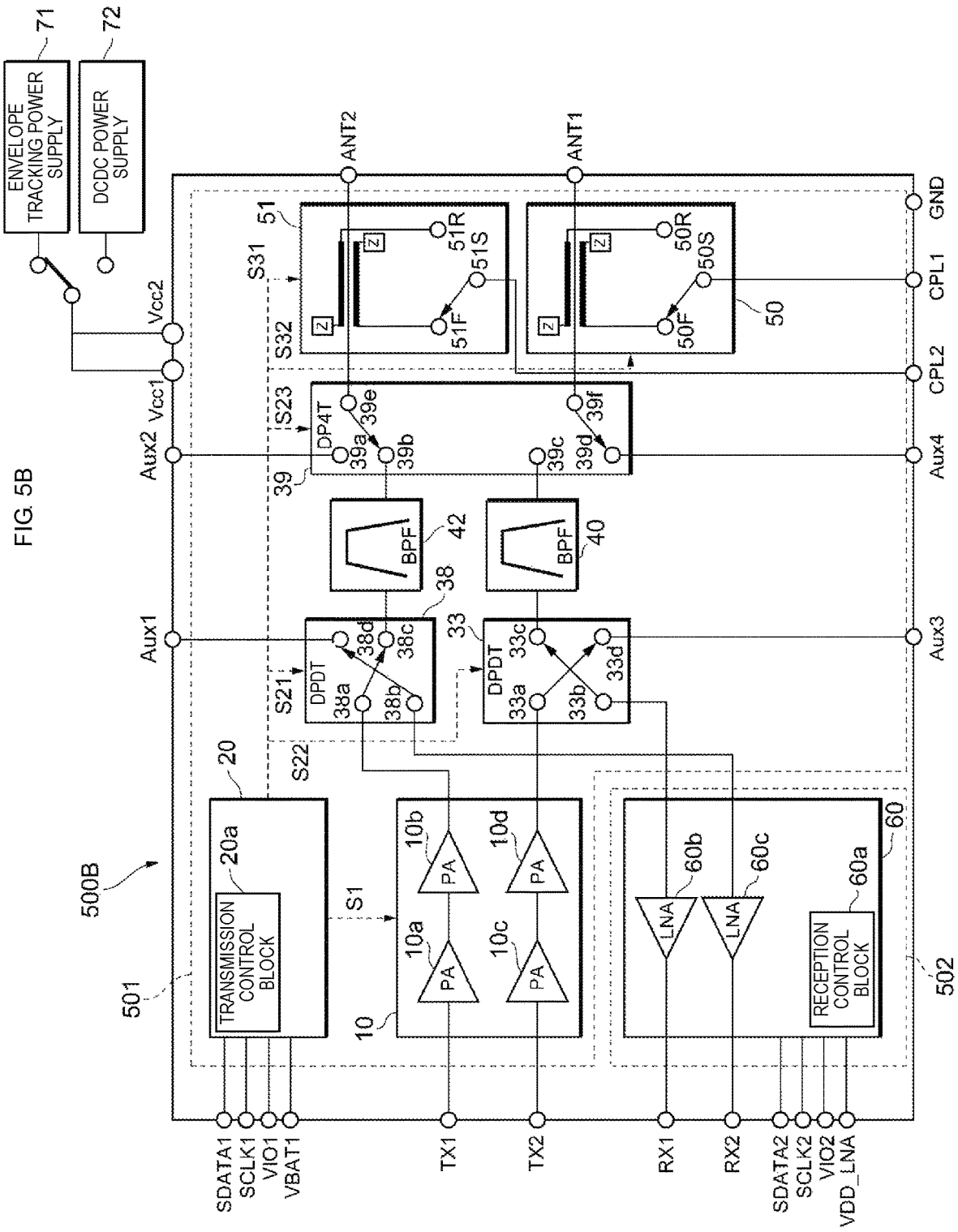
FIG. 5B illustrates an example of a configuration of a high-frequency module according to a first modification of the fifth embodiment of the present disclosure.

FIG. 5B illustrates an example of a configuration of a high-frequency module (high-frequency module 500B) according to a first modification of the fifth embodiment of the present disclosure. Hereinafter, a respect in which the configuration of the high-frequency module 500B differs from the configuration of the high-frequency module 500A will be described, and description of respects in which the configuration of the high-frequency module 500B is similar to the configuration of the high-frequency module 500A is appropriately omitted.

The high-frequency module 500B includes terminals Aux1, Aux2, Aux3, and Aux4. The high-frequency module 500B includes a DPDT switch 38 in place of the SPDT switch 35 and includes a double pole four throw (DP4T) switch 39 in place of the DP3T switch 37. The DP4T switch 39 is a high-frequency switch element having a 2×4 input-output terminal. Furthermore, the high-frequency module 500B does not include the BPF 41.

The DPDT switch 38 includes a terminal 38a connected to the amplifier 10b, a terminal 38b connected to the LNA 60c, a terminal 38c connected to the BPF 42, and a terminal 38d connected to the terminal Aux1. The terminal 33d of the DPDT switch 33 is connected to the terminal Aux3. The DP4T switch 39 includes a terminal 39a connected to the terminal Aux2, a terminal 39b connected to the BPF 42, a terminal 39c connected to the BPF 40, a terminal 39d connected to the terminal Aux4, a terminal 39e connected to the coupler 51, and a terminal 39f connected to the coupler 50.

The terminals Aux1 and Aux2 are terminals for connection to an external BPF. Similarly, the terminals Aux3 and Aux4 are terminals for connection to an external BPF. Thus, in the high-frequency module 500B, the BPFs 40 and 42, the external BPF connected to the terminals Aux1 and Aux2, and the external BPF connected to the terminals Aux3 and Aux4 are able to be selectively used in accordance with a desired frequency band.

(5-3) Second Modification of Fifth Embodiment

Figure 5C:
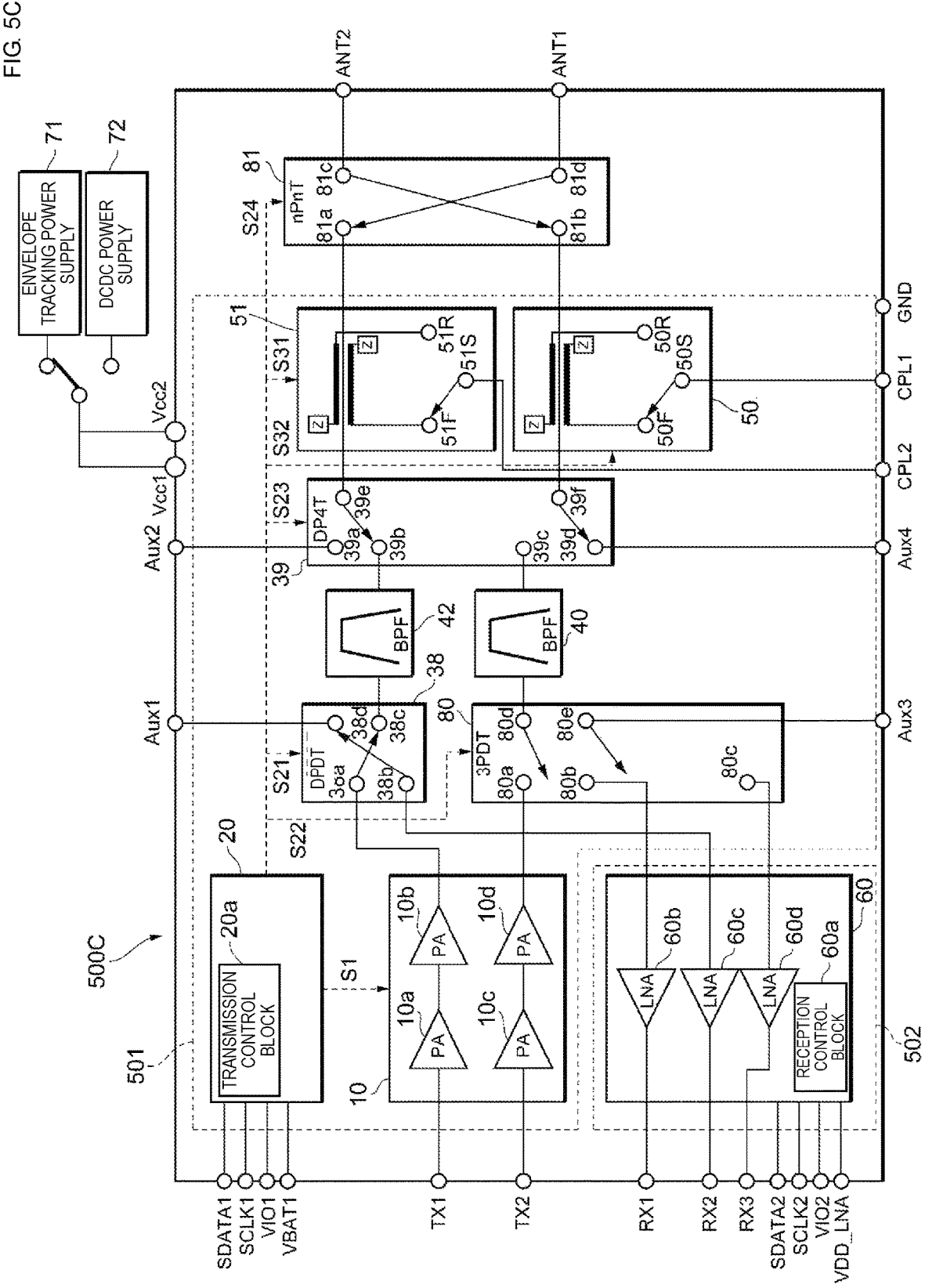
FIG. 5C illustrates an example of a configuration of a high-frequency module according to a second modification of the fifth embodiment of the present disclosure.

FIG. 5C illustrates an example of a configuration of a high-frequency module (high-frequency module 500C) according to a second modification of the fifth embodiment of the present disclosure. Hereinafter, a respect in which the configuration of the high-frequency module 500C differs from the configuration of the high-frequency module 500B will be described, and description of respects in which the configuration of the high-frequency module 500C is similar to the configuration of the high-frequency module 500B is appropriately omitted.

The high-frequency module 500C further includes a terminal RX3 for outputting a reception signal. A reception signal path extending from the terminal RX3 is taken as a third reception signal path. Furthermore, the high-frequency module 500C includes a 3PDT switch 80 in place of the DPDT switch 33. The reception control unit 60 of the high-frequency module 500C further includes an LNA 60d.

Furthermore, the high-frequency module 500C includes an n pole n throw (nPnT) switch 81. The nPnT switch 81 is a high-frequency switch element having an n×n (where n is a natural number) input-output terminal. In FIG. 5C, for convenience of explanation, only terminals 81a, 81b, 81c, and 81d of the nPnT switch 81 are illustrated. The transmission control block 20a supplies a control signal S24 to the nPnT switch 81.

The 3PDT switch 80 includes a terminal 80a connected to the amplifier 10d, a terminal 80b connected to the LNA 60b, a terminal 80c connected to the LNA 60d, a terminal 80d connected to the BPF 40, and a terminal 80e connected to the terminal Aux3. Thus, in the high-frequency module 500C, three systems of reception signal paths corresponding to desired frequency bands are constructed, thereby increasing sensitivity to a reception signal. Furthermore, gain control of an LNA corresponding to a desired frequency is also able to be performed.

(5-4) Third Modification of Fifth Embodiment

FIG. 5D illustrates an example of a configuration of a high-frequency module (high-frequency module 500D) according to a third modification of the fifth embodiment of the present disclosure. Hereinafter, a respect in which the configuration of the high-frequency module 500D differs from the configuration of the high-frequency module 500A will be described, and description of respects in which the configuration of the high-frequency module 500D is similar to the configuration of the high-frequency module 500A is appropriately omitted.

The high-frequency module 500D does not include the DP3T switch 37 and includes an SPDT switch 82 in place of the DPDT switch 33. The coupler 51 is connected to a subsequent stage subsequent to the SPDT switch 35, and the coupler 50 is connected to a subsequent stage subsequent to the SPDT switch 82. The SPDT switch 82 includes a terminal 82a connected to the amplifier 10d, a terminal 82b connected to the LNA 60b, and a terminal 82c connected to the coupler 50.

The high-frequency module 500D includes, in place of the BPFs 40, 41, and 42, a duplexer 90 that separates a frequency higher and a frequency lower than a predetermined frequency from each other. Furthermore, in the high-frequency module 500D, the coupler 51 is provided on the first transmission signal path extending from the terminal TX1, and the coupler 50 is provided on the second transmission signal path extending from the terminal TX2. This enables one antenna of a terminal to be shared by two systems of transmission signal paths and two systems of reception signal paths.

(5-5) Fourth Modification of Fifth Embodiment

Figure 5E:
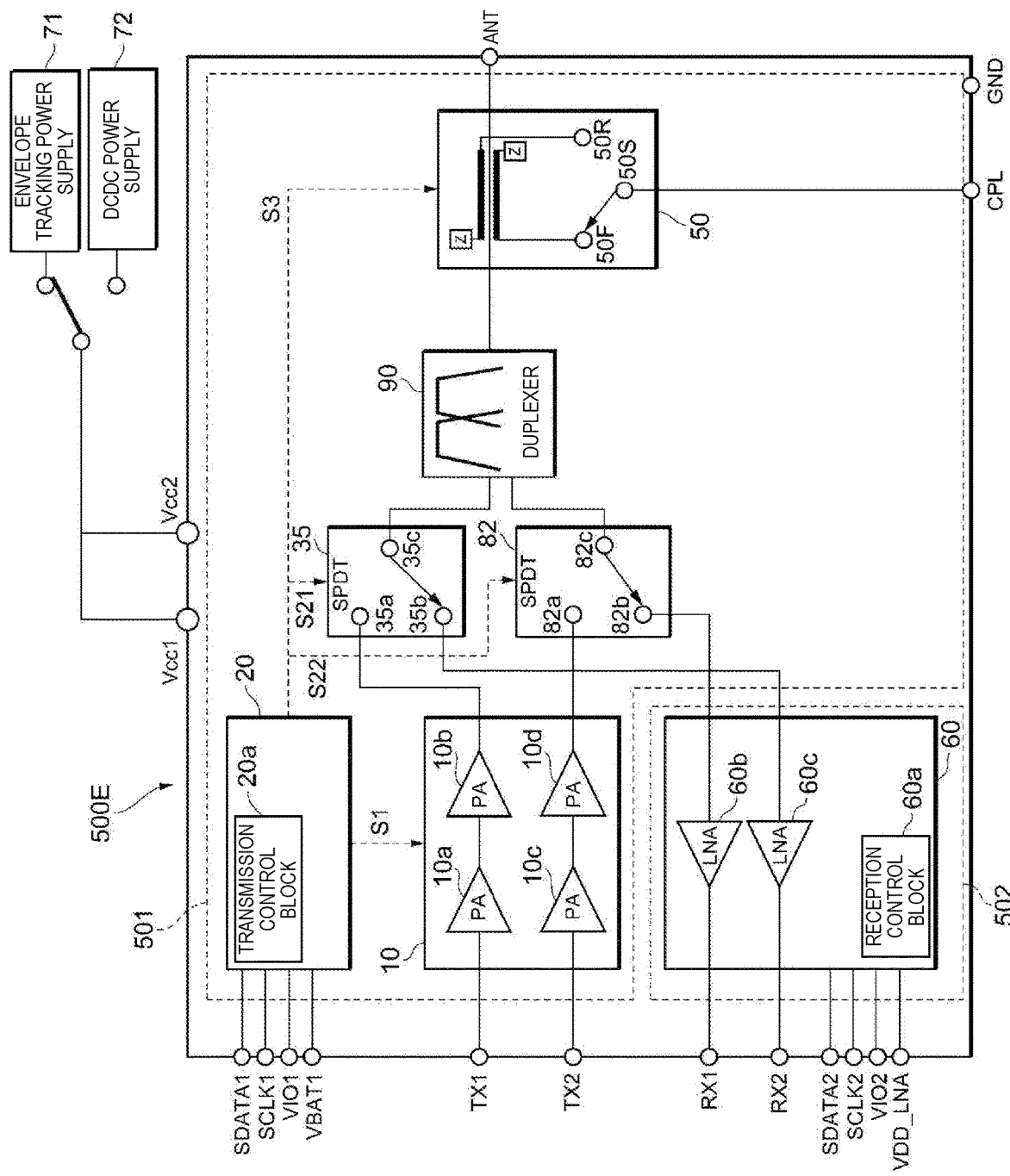
FIG. 5E illustrates an example of a configuration of a high-frequency module according to a fourth modification of the fifth embodiment of the present disclosure.

FIG. 5E illustrates an example of a configuration of a high-frequency module (high-frequency module 500E) according to a fourth modification of the fifth embodiment of the present disclosure. Hereinafter, a respect in which the configuration of the high-frequency module 500E differs from the configuration of the high-frequency module 500D will be described, and description of respects in which the configuration of the high-frequency module 500E is similar to the configuration of the high-frequency module 500D is appropriately omitted.

In the high-frequency module 500E, the duplexer 90 is connected to a subsequent stage subsequent to each of the SPDT switch 35 and the SPDT switch 82. Specifically, the duplexer 90 is connected to a terminal 35c of the SPDT switch 35 and the terminal 82c of the SPDT switch 82. In the high-frequency module 500E, the coupler 50 is connected to a subsequent stage subsequent to the duplexer 90. Furthermore, the high-frequency module 500E does not include the coupler 51. The duplexer 90 may be a surface acoustic wave (SAW) filter, a bulk acoustic wave (BAW) filter, or an LC filter.

In the high-frequency module 500E, the coupler 50 is connected to a previous stage previous to the antenna terminal ANT, thus enabling one antenna of a terminal to be shared by two systems of transmission signal paths and two systems of reception signal paths. Furthermore, the number of RF systems is one and one coupler is enough, thus contributing to a reduction in the size of the module.

(6) Sixth Embodiment

FIG. 6 illustrates an example of a configuration of a high-frequency module (high-frequency module 600) according to a sixth embodiment of the present disclosure. Hereinafter, a respect in which the configuration of the high-frequency module 600 differs from the configuration of the high-frequency module 100A will be described, and description of respects in which the configuration of the high-frequency module 600 is similar to the configuration of the high-frequency module 100A is appropriately omitted.

The high-frequency module 600 includes the two terminals TX1 and TX2 for inputting a transmission signal, and the two terminals RX1 and RX2 for outputting a reception signal. The terminal TX1 and the terminal RX1 are connected to an RFIC 1000, and the terminal TX2 and the terminal RX2 are connected to an RFIC 2000. Here, the RFICs 1000 and 2000 are RFICs used for respective different communication schemes. The RFIC 1000 supplies a transmission signal to the terminal TX1 and receives supply of a reception signal from the terminal RX1. The RFIC 2000 supplies a transmission signal to the terminal TX2 and receives supply of a reception signal from the terminal RX2.

The high-frequency module 600 includes an SPDT switch 83 (second switch) and an SPDT switch 84 (third switch). In the SPDT switch 83, a terminal 83a is connected to the terminal TX1, a terminal 83b is connected to the terminal TX2, and a terminal 83c is connected to the amplifier 10a of the amplifier unit 10. In the SPDT switch 84, a terminal 84a is connected to the terminal RX1, a terminal 84b is connected to the terminal RX2, and a terminal 84c is connected to the LNA 60b of the reception control unit 60.

The SPDT switch 83 is connected to a previous stage previous to the amplifier unit 10 and selectively connects the amplifier unit 10 to the terminals TX1 and TX2. The SPDT switch 84 is connected to a previous stage previous to the reception control unit 60 and selectively connects the LNA 60b of the reception control unit 60 to the terminals RX1 and RX2. Thus, in the high-frequency module 600, a plurality of different communication schemes are able to be switched.

(7) Reference Example

Figure 7:
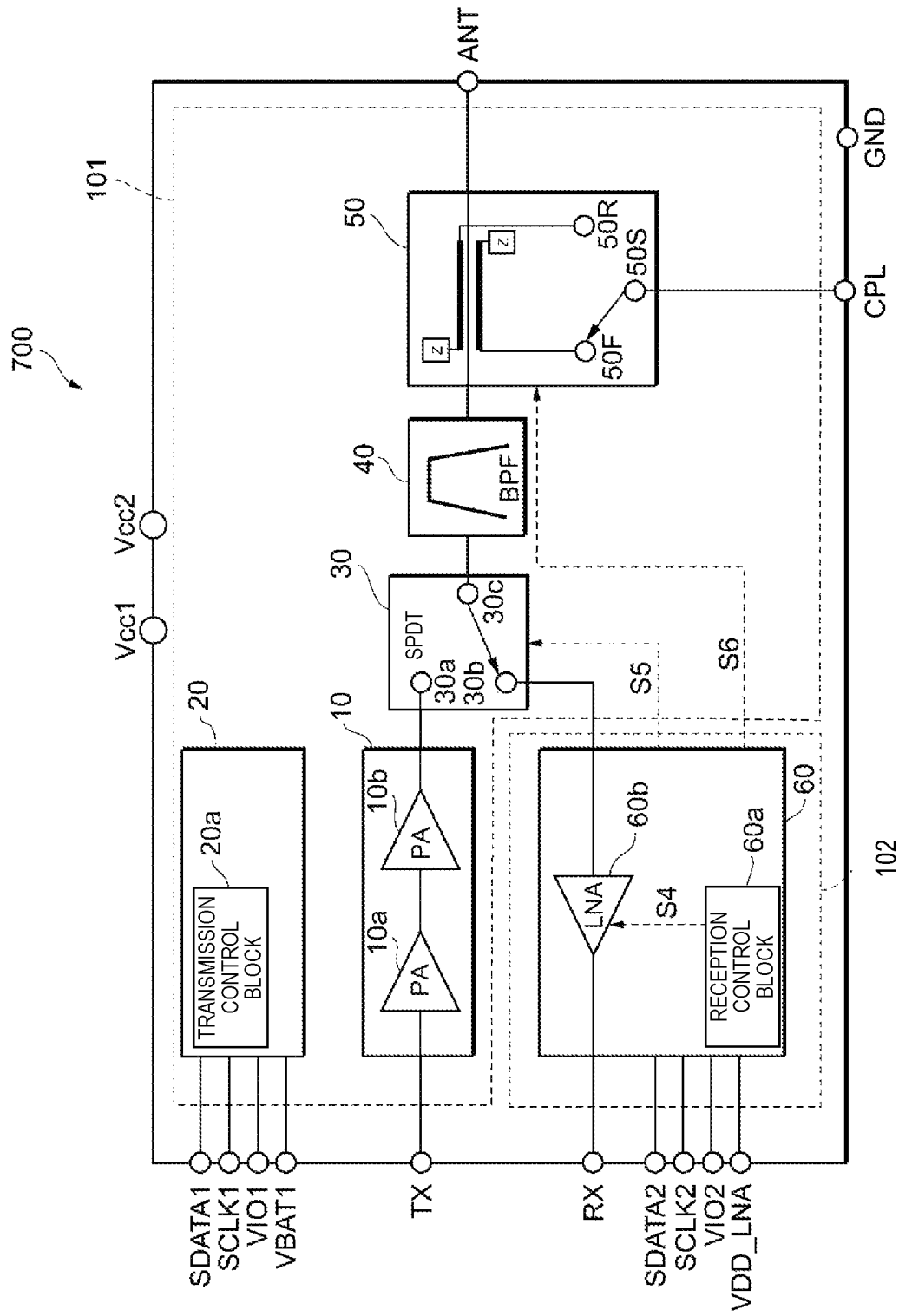
FIG. 7 illustrates an example of a configuration of a high-frequency module according to a reference example.

FIG. 7 illustrates an example of a configuration of a high-frequency module (high-frequency module 700) according to a reference example. Hereinafter, a respect in which the configuration of the high-frequency module 700 differs from the configuration of the high-frequency module 100A will be described, and description of respects in which the configuration of the high-frequency module 700 is similar to the configuration of the high-frequency module 100A is appropriately omitted.

In the high-frequency module 100A, the transmission control block 20a controls the SPDT switch 30 and the coupler 50. However, in the high-frequency module 700, the reception control block 60a may control the SPDT switch 30 and the coupler 50. Specifically, the reception control block 60a respectively supplies a control signal S4, a control signal S5, and a control signal S6 to the LNA 60b, the SPDT switch 30, and the coupler 50. Subsequently, the LNA 60b, the SPDT switch 30, and the coupler 50 respectively operate based on the control signal S4, the control signal S5, and the control signal S6. Thus, in the high-frequency module 700, the SPDT switch 30 and the coupler 50 are able to be controlled in synchronization with the control of a reception signal.

The embodiments according to the present disclosure have been described above. A high-frequency module according to one embodiment of the present disclosure includes a transmission signal amplifier configured to amplify a radio frequency signal and output a transmission signal to an antenna terminal side; a reception signal amplifier configured to amplify a reception signal supplied from an antenna terminal; a switch configured to selectively connect the antenna terminal to either the transmission signal amplifier or the reception signal amplifier; and a directional coupler provided on a transmission signal path between the transmission signal amplifier and the antenna terminal and configured to detect a signal level of the transmission signal. The transmission signal amplifier is controlled by a first control signal supplied from a first control circuit. The reception signal amplifier is controlled by a second control signal supplied from a second control circuit. The switch is controlled by a switch control signal supplied from the first control circuit. The directional coupler is controlled by a coupler control signal supplied from the first control circuit.

This enables switching to a state in which the quality of an antenna for which a communication environment is favorable is able to be detected with little time delay when transmission control and reception control are switched.

Furthermore, in the high-frequency module according to the one embodiment of the present disclosure, the directional coupler may be connected to an antenna terminal side of the switch.

This enables impedance matching on a side close to the antenna terminal to be checked.

Furthermore, in the high-frequency module according to the one embodiment of the present disclosure, the switch may be connected to an antenna terminal side of the directional coupler.

This enables the directional coupler to directly detect an output of the transmission signal amplifier.

Furthermore, in the high-frequency module according to the one embodiment of the present disclosure, the switch may be constituted by a plurality of switch elements.

This increases flexibility in circuit layout in the high-frequency module.

Furthermore, in the high-frequency module according to the one embodiment of the present disclosure, the switch may be constituted by a single switch element.

This reduces the manufacturing cost of the high-frequency module and also increases the ease of assembly.

Furthermore, in the high-frequency module according to the one embodiment of the present disclosure, the directional coupler may be a bidirectional coupler configured to further detect a signal level of a reflected wave of the transmission signal.

This enables detection of a signal level of a reflected wave of the transmission signal.

Furthermore, the high-frequency module according to the one embodiment of the present disclosure may further include a band pass filter configured to remove a frequency component outside a predetermined frequency band from a signal and provided on at least either the transmission signal path or a reception signal path between the reception signal amplifier and the antenna terminal.

This enables a transmission signal and/or a reception signal in a desired frequency band to be obtained.

Furthermore, the high-frequency module according to the one embodiment of the present disclosure may include a terminal configured to connect the high-frequency module to an external band pass filter configured to remove a frequency component outside a predetermined frequency band from a signal.

This enables a transmission signal and/or a reception signal in a desired frequency band to be obtained more easily.

Furthermore, the high-frequency module according to the one embodiment of the present disclosure may further include a second switch connected to a side of the transmission signal amplifier opposite to the antenna terminal.

This enables switching of the transmission signal path in accordance with a plurality of communication schemes.

Furthermore, the high-frequency module according to the one embodiment of the present disclosure may further include a third switch connected to a side of the reception signal amplifier opposite to the antenna terminal.

This enables switching of the reception signal path in accordance with a plurality of communication schemes.

The above-described embodiments are intended to facilitate understanding of the present disclosure but are not intended for a limited interpretation of the present disclosure. The present disclosure can be changed or improved without departing from the gist thereof and includes equivalents thereof. That is, appropriate design changes made to the embodiments by those skilled in the art are also included in the scope of the present disclosure as long as the changes have features of the present disclosure. For example, the elements included in the embodiments, and the arrangements, materials, conditions, shapes, sizes, and so forth of the elements are not limited to those exemplified in the embodiments and can be appropriately changed. Furthermore, the elements included in the embodiments can be combined as much as technically possible, and such combined elements are also included in the scope of the present disclosure as long as the combined elements have the features of the present disclosure.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A high-frequency module comprising:
   a transmission signal amplifier configured to amplify a radio frequency signal and output a transmission signal to an antenna terminal;
   a reception signal amplifier configured to amplify a reception signal supplied from the antenna terminal;
   a switch circuit configured to selectively connect the antenna terminal to an output of the transmission signal amplifier and an input of the reception signal amplifier;
   a directional coupler provided on a transmission signal path between the transmission signal amplifier and the antenna terminal, the directional coupler being configured to detect a signal level of the transmission signal;
   a first control circuit configured to control:
      the transmission signal amplifier by a first control signal,
      the switch circuit by a switch control signal, and
      the directional coupler by a coupler control signal; and
   a second control circuit configured to control the reception signal amplifier by a second control signal,
   wherein the switch circuit is connected directly to the input of the reception signal amplifier.

2. The high-frequency module according to claim 1, wherein the directional coupler is connected between the antenna terminal and the switch circuit.

3. The high-frequency module according to claim 2, wherein the switch circuit comprises a plurality of switches.

4. The high-frequency module according to claim 2, wherein the switch circuit includes only a single switch.

5. The high-frequency module according to claim 2, wherein the directional coupler is a bidirectional coupler further configured to detect a signal level of a reflected wave of the transmission signal.

6. The high-frequency module according to claim 1, wherein the switch circuit is connected between the antenna terminal and the directional coupler.

7. The high-frequency module according to claim 6, wherein the switch circuit comprises a plurality of switches.

8. The high-frequency module according to claim 6, wherein the switch circuit includes only a single switch.

9. The high-frequency module according to claim 6, wherein the directional coupler is a bidirectional coupler further configured to detect a signal level of a reflected wave of the transmission signal.

10. The high-frequency module according to claim 1, wherein the switch circuit comprises a plurality of switches.

11. The high-frequency module according to claim 10, wherein the directional coupler is a bidirectional coupler further configured to detect a signal level of a reflected wave of the transmission signal.

12. The high-frequency module according to claim 1, wherein the switch circuit includes only a single switch.

13. The high-frequency module according to claim 12, wherein the directional coupler is a bidirectional coupler further configured to detect a signal level of a reflected wave of the transmission signal.

14. The high-frequency module according to claim 1, wherein the directional coupler is a bidirectional coupler further configured to detect a signal level of a reflected wave of the transmission signal.

15. The high-frequency module according to claim 1, further comprising:
    a band pass filter provided on the transmission signal path, or a reception signal path between the reception signal amplifier and the antenna terminal,
    wherein the band pass filter is configured to attenuate frequencies outside a frequency band of the transmission signal when the band pass filter is provided on the transmission signal path, and
    wherein the band pass filter is configured to attenuate frequencies outside a frequency band of the reception signal when the band pass filter is provided on the reception signal path.

16. The high-frequency module according to claim 1, further comprising:
    a first band pass filter provided on the transmission signal path and configured to attenuate frequencies outside a frequency band of the transmission signal; and
    a second band pass filter provided on a reception signal path between the reception signal amplifier and the antenna terminal, and configured to attenuate frequencies outside a frequency band of the reception signal.

17. The high-frequency module according to claim 16, wherein the first band pass filter and the second band pass filter are configured as a duplexer.

18. The high-frequency module according to claim 1, further comprising:
    a terminal configured to connect the high-frequency module to an external band pass filter,
    wherein the external band pass filter is configured to attenuate frequencies outside a frequency band of the transmission signal or the reception signal.

19. The high-frequency module according to claim 1, further comprising:
    a second switch circuit, wherein the transmission signal amplifier is connected between the second switch circuit and the antenna terminal.

20. The high-frequency module according to claim 1, further comprising:
    a third switch circuit, wherein the reception signal amplifier is connected between the third switch circuit and the antenna terminal.

21. The high-frequency module according to claim 1, wherein the first control signal, the switch control signal, and the coupler control signal are synchronized with one another.

\* \* \* \* \*

UNITED STATES PATENT AND TRADEMARK OFFICE
CERTIFICATE OF CORRECTION

PATENT NO. : 11,088,720 B2
APPLICATION NO. : 16/215777
DATED : August 10, 2021
INVENTOR(S) : Satoshi Sakurai et al.

It is certified that error appears in the above-identified patent and that said Letters Patent is hereby corrected as shown below:

On the Title Page

Item (30) Foreign Application Priority Data, delete "June 22, 2018 (JP)...........2018-119249" and insert -- June 22, 2018 (JP)...........JP2018-119249 --.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*